(12) United States Patent
Jeung

(10) Patent No.: US 10,141,799 B2
(45) Date of Patent: Nov. 27, 2018

(54) OUTER-ROTOR-TYPE SWITCHED RELUCTANCE MOTOR

(71) Applicant: SN INNOVATION CO., LTD., Daejeon (KR)

(72) Inventor: Young Chun Jeung, Seoul (KR)

( * ) Notice: Subject to any disclaimer, the term of this patent is extended or adjusted under 35 U.S.C. 154(b) by 0 days.

(21) Appl. No.: 14/894,546

(22) PCT Filed: Oct. 19, 2015

(86) PCT No.: PCT/KR2015/011008
§ 371 (c)(1),
(2) Date: Nov. 30, 2015

(87) PCT Pub. No.: WO2017/003033
PCT Pub. Date: Jan. 5, 2017

(65) Prior Publication Data
US 2018/0102682 A1    Apr. 12, 2018

(30) Foreign Application Priority Data

Jun. 29, 2015 (KR) .................. 10-2015-0092341

(51) Int. Cl.
*H02K 1/08* (2006.01)
*H02K 1/16* (2006.01)
(Continued)

(52) U.S. Cl.
CPC ............. *H02K 1/246* (2013.01); *H02K 1/08* (2013.01); *H02K 1/145* (2013.01); *H02K 1/16* (2013.01);
(Continued)

(58) Field of Classification Search
CPC ........... H02K 1/08; H02K 1/145; H02K 1/16; H02K 1/246; H02K 3/38; H02K 3/52;
(Continued)

(56) References Cited

U.S. PATENT DOCUMENTS 2,008,538 A * 7/1935 Baumeister ............ H02P 25/08
310/162
4,698,537 A * 10/1987 Byrne .................... H02K 1/246
310/168
(Continued)

FOREIGN PATENT DOCUMENTS

KR    10-1255951    5/2013

OTHER PUBLICATIONS

Labak et al, "Outer Rotor Switched Reluctance Motor Design for In-wheel Drive of Electric Bus Applications", U. of Windsor, Canada, IEEE transaction, 2012.*
(Continued)

*Primary Examiner* — John K Kim
(74) *Attorney, Agent, or Firm* — Antonio Ha & U.S. Patent, LLC

(57) ABSTRACT

The present invention relates to an outer-rotator-type switched reluctance motor that may provide a shortest magnetic path by configuring a magnetic circuit in stator salient poles and rotor salient poles with circumferential-directional slots formed in the stator salient poles and coils passing through the slots and wound along the circumferential direction of the stator core, may thus minimize magnetic loss in the cores to maximize use efficiency of magnetic energy, and may provide a sturdy structure while simplifying coil winding work.

3 Claims, 15 Drawing Sheets

(51) Int. Cl.
  *H02K 1/24*  (2006.01)
  *H02K 3/38*  (2006.01)
  *H02K 3/52*  (2006.01)
  *H02K 15/00*  (2006.01)
  *H02K 3/48*  (2006.01)
  *H02K 11/00*  (2016.01)
  *H02K 19/10*  (2006.01)
  *H02K 37/04*  (2006.01)
  *H02K 1/14*  (2006.01)
  *H02K 11/215*  (2016.01)

(52) U.S. Cl.
  CPC ................ *H02K 1/24* (2013.01); *H02K 3/48* (2013.01); *H02K 3/52* (2013.01); *H02K 11/00* (2013.01); *H02K 11/215* (2016.01); *H02K 15/0031* (2013.01); *H02K 19/10* (2013.01); *H02K 37/04* (2013.01); *H02K 2213/03* (2013.01)

(58) Field of Classification Search
  CPC .. H02K 11/00; H02K 11/215; H02K 15/0031; H02K 19/00; H02K 37/04; H02K 2213/03
  USPC ......................................................... 310/269
  See application file for complete search history.

(56) References Cited

U.S. PATENT DOCUMENTS

| | | | | |
|---|---|---|---|---|
| 5,747,912 | A * | 5/1998 | Sakuma | H02K 19/103 310/168 |
| 2010/0295389 | A1* | 11/2010 | Tessier | H02K 1/145 310/46 |
| 2013/0015741 | A1* | 1/2013 | Kim | H02K 21/18 310/114 |
| 2013/0026864 | A1* | 1/2013 | Bae | H02K 19/103 310/46 |
| 2013/0038147 | A1* | 2/2013 | Dede | H02K 29/03 310/46 |
| 2014/0028424 | A1* | 1/2014 | Dede | H01F 5/003 335/296 |
| 2018/0102682 | A1* | 4/2018 | Jeung | H02K 1/24 |

OTHER PUBLICATIONS

Kim et al, "Extended Theory of Flux-Compression/Expansion in VR type Homopolar Converter for Electric Vehicle", PCIM INTER-98 Proceeding, 1998.*
English specification of 10-1255951.

* cited by examiner

Fig. 2
(a)
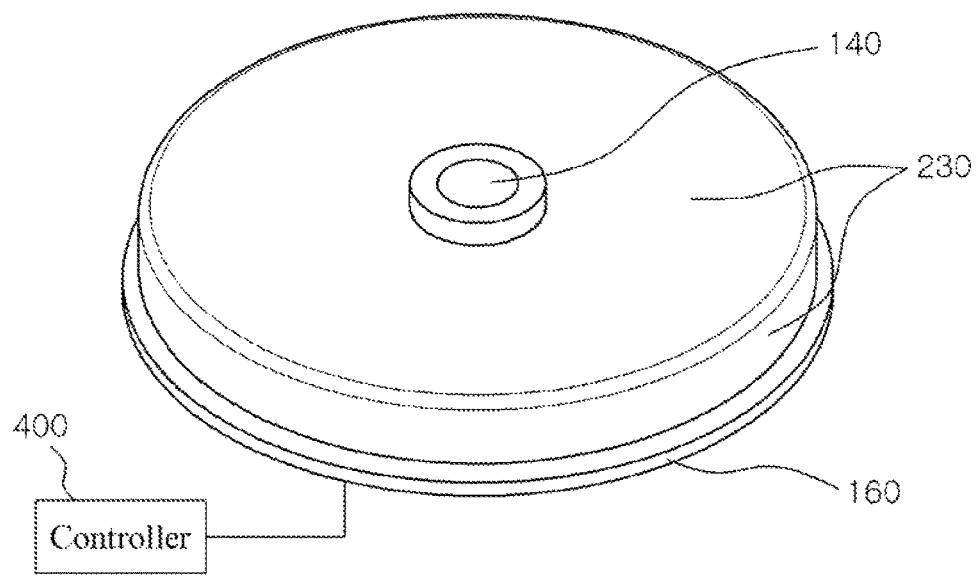
(b)
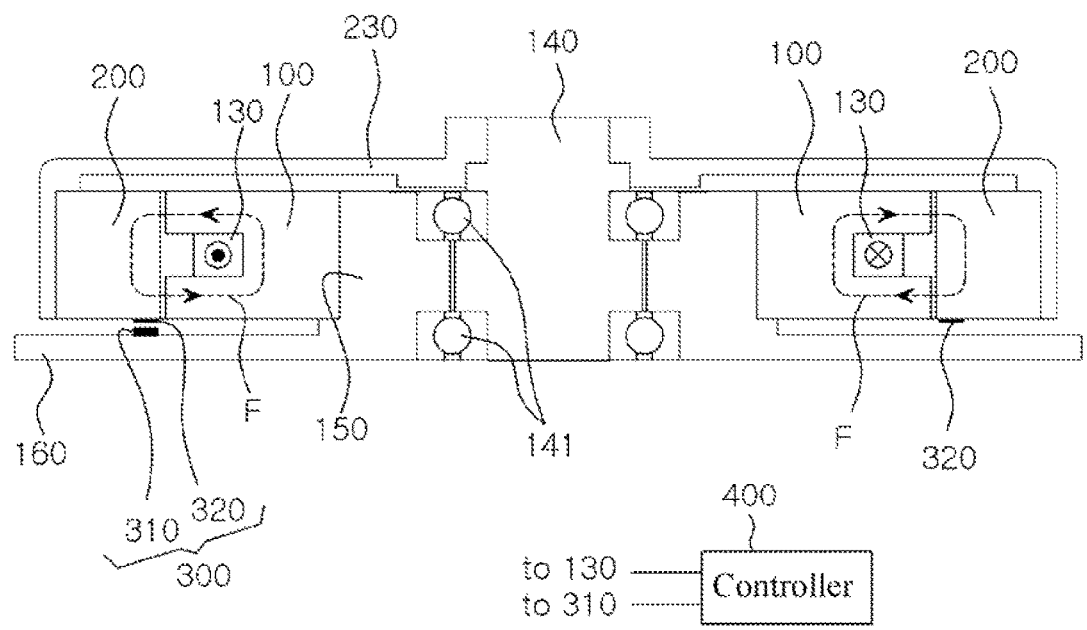

Fig. 12
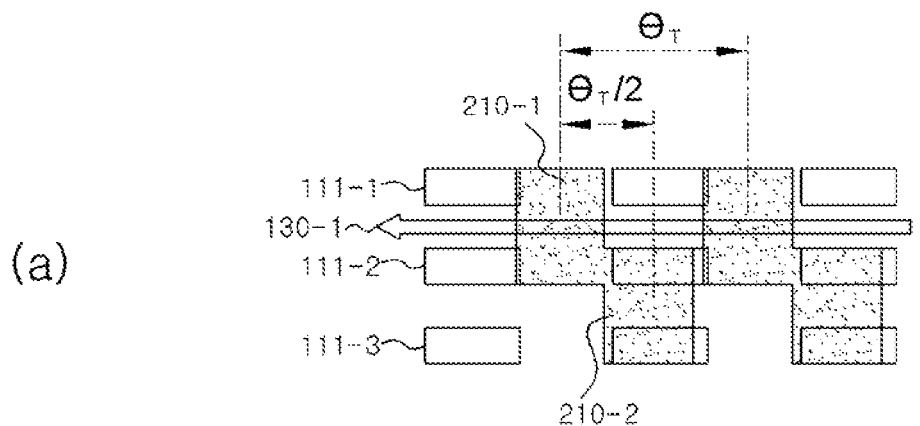
(a)
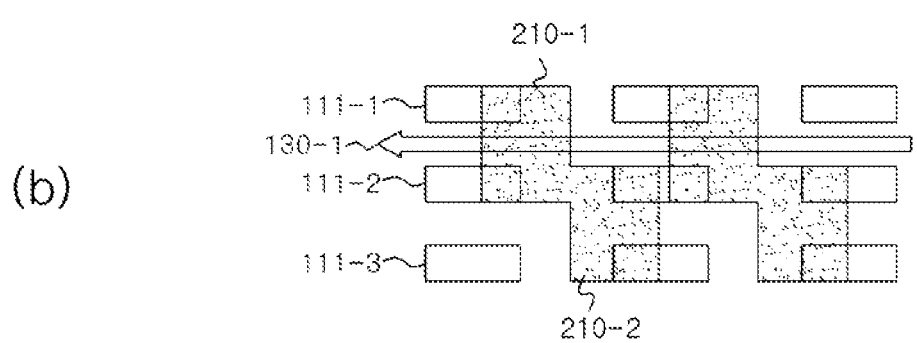
(b)
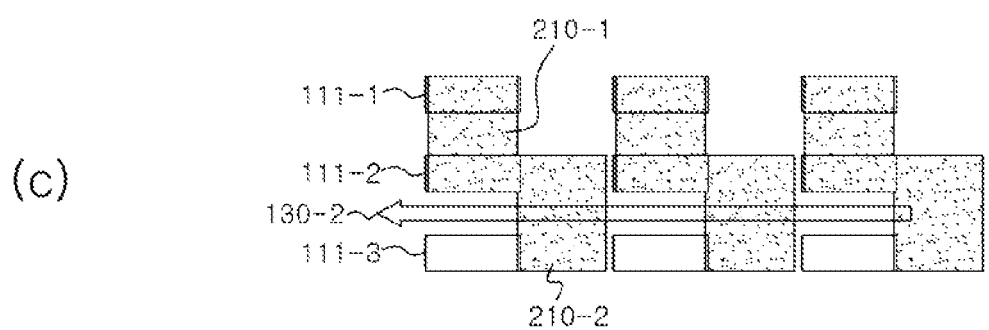
(c)

OUTER-ROTOR-TYPE SWITCHED RELUCTANCE MOTOR

TECHNICAL FIELD

The present invention relates to an outer-rotor-type switched reluctance motor configured with a stator core having stator salient poles formed on an outer circumferential surface thereof and excited by a coil and an outer rotor core having rotor salient poles formed on an inner circumferential surface thereof and facing the stator salient poles with air gaps disposed between the stator salient poles and the rotor salient poles, and more specifically, which may thus minimize magnetic loss in the cores to maximize use efficiency of magnetic energy, and may provide a sturdy structure while simplifying coil winding work.

DISCUSSION OF RELATED ART

A switched reluctance motor (SRM) has a simplified structure without the need of a brush, in which an excitation coil is wound only on the stator and the rotator is constituted only of an iron core without any excitation means (e.g., an excitation coil or permanent magnet). Switched reluctance motors are easy to manufacture, sturdy, and relatively more reliable or higher price competitive than other types of motors and thus attract more attention for various applications.

As shown in FIG. 1, a conventional outer-rotor-type switched reluctance motor includes a stator core 10 having a stator yoke 12 rotatably supporting a rotation shaft 13 and stator salient poles 11 provided on an outer circumferential surface of the stator yoke 12, a rotator core 20 including a rotator yoke 22 surrounding the stator core 10 and rotatably fastened to the rotation shaft 13 and rotator salient poles 21 formed on an inner circumferential surface of the rotator yoke 22 to face the stator salient poles 11 with air gaps provided therebetween, and an excitation coil 30 wound around the stator core 11.

In such a structure of switched reluctance motor, magnetic paths (F) are formed by magnetic fields created by the excitation coil 30 across two pairs of salient poles 11 and 21, the stator yoke 12 connecting the two stator salient poles 11, and the rotator yoke 22 connecting the two rotator salient poles 21. As such, very long magnetic paths (F) are formed.

Although the switched reluctance motor is configured to have a multi-pole structure by adding more salient poles, magnetic paths are inevitably generated through the stator yoke 12 and the rotator yoke 22 along the circumferential direction thereof.

Thus, magnetic loss may arise in the section of magnetic paths formed in the circumferential direction, thus deteriorating the overall use efficiency of magnetic energy.

Further, since the excitation coil 30 is required to be wound around each stator salient pole 11, the coil winding work becomes too tricky, and the excitation coil 30 is difficult to place in a stable position. Further, the need of an extra room for winding the coil renders it difficult to reduce the overall size of the motor.

Meanwhile, outer-rotator-type motors that may be used as, e.g., wheel-in motors (or in-wheel motors), provide various applications and benefits that inner-rotator-type motors lack.

PRIOR TECHNICAL DOCUMENTS

Patent Documents (Patent Document 1) KR 10-1255951 B1 2013.04.11.

SUMMARY

Accordingly, an object of the present invention is to provide an outer-rotator-type switched reluctance motor that allows as short a magnetic path as possible, easier coil winding, a smaller size, and an optimized structure for outer-rotator-type motors.

To achieve the above object, according to the present invention, there is provided an outer-rotator-type switched reluctance motor comprising a stator core 100 including a stator yoke 120 having a hollow formed therethrough in upper and lower directions, stator salient poles 110 formed isotropic-rectangularly on an outer circumferential surface of the stator yoke 120, respectively having slots 112 formed along a circumferential direction to separate each stator salient pole 110 into upper and lower stator salient poles 110, and allowing a coil 130 to sequentially pass through the respective slots 112 of the stator salient poles 110 and to be wound on the outer circumferential surface of the stator yoke 120 along the circumferential direction, and a shaft 140 rotatably mounted in the hollow of the stator yoke 120; a rotator core 200 having rotator salient poles 210 isotropic-rectangularly formed on an inner circumferential surface thereof along the circumferential direction and covering and facing the upper and lower salient pole pieces 111 of the stator salient poles 110 with air gaps disposed therebetween and fastened to the shaft 140 to be rotatable; a position detecting means 300 sensing a rotational position of the rotator core 200; and a controller 400 applying electricity to the coil 130 during a time period where the stator salient poles 110 and the rotor salient poles 210 turn from non-alignment to alignment to generate a positive torque.

The outer-rotor-type switched reluctance motor includes a stator base 160 disposed under the stator core 100 to support the stator core 100. The position detecting means 300 includes a sensed target 320 formed on a bottom surface of a rotor salient pole of the rotor core 200 to fit a section between both ends of the rotor salient pole in a rotation direction and a position detecting sensor 310 provided on a top surface of the stator base 160 to fit a position of one of both ends of a stator salient pole in the circumferential direction, which starts to first face the rotor salient pole as the rotator core 200 rotates to sense the start and end of the sensed target 320 when the rotator core 200 rotates, and wherein the controller 400 switches on/off application of electricity to the coil 130 corresponding to a time of sensing by the position detecting sensor 310.

According to an aspect of the reception, the sensed target 320 is formed of a magnet, and the position detecting sensor 310 is formed of a hall sensor sensing a magnetic field created by the magnet.

According to an aspect of the present invention, the sensed target 320 is formed of a reflecting body, and the position detecting sensor 310 is formed of a photo-sensor sensing light reflected by a reflecting plate.

N stator cores 100 are provided, wherein N>1, wherein the stator salient poles 110 are stacked to be aligned in line with each other along a rotation shaft direction, wherein N rotator cores 200 are stacked to respectively correspond to the N stator cores 100, and wherein the N rotator cores 200 are stacked so that one rotor salient pole is positioned on each vertical line passing through a position obtained by dividing a rotation angle between two rotor salient poles 210 positioned adjacent to each other in the circumferential direction by N to thereby form an N-phase motor.

The N rotator cores 200 are integrally formed to have a single hollow body and the N rotor salient poles 210 formed along the rotation shaft direction on an inner circumferential surface of the hollow body to correspond to the N stator salient poles 110, and wherein the N rotor salient poles 210 respectively are positioned on vertical lines passing through positions obtained by dividing the rotation angle between the two rotor salient poles 210 positioned adjacent to each other in the circumferential direction by N, and rotor salient poles 210 positioned adjacent to each other in the upper and lower directions of the N rotor salient poles 210 are continuous to each other in a stepwise shape.

N slots 112 are formed at equidistant intervals along the rotation shaft direction, wherein N>1, to form N+1 salient pole pieces 111, wherein the coil 130 is wound around each slot 112, wherein the rotor salient poles 210 have a plurality of upper-lower directional steps stepwise formed along the rotation shaft direction to be simultaneously aligned with two adjacent upper and lower salient pole pieces 111, wherein an angular difference occurs between the steps by an angle obtained by dividing the rotation angle between the two stator salient poles 110 positioned adjacent to each other in the circumferential direction by N, wherein an overlapping portion corresponding to an upper-lower height of the salient pole pieces 111 is provided between the two steps positioned adjacent to each other in the upper and lower directions so that the steps are continuous to each other through the overlapping portion, wherein the two salient pole pieces 111 positioned adjacent to each other in the upper and lower directions and simultaneously aligned alternately with the steps are sequentially changed as the rotator cores 200 are rotated, and wherein the controller 400 stops the application of electricity at least before the time of the alignment after the electricity has started to be applied to the coil 130 between the two salient pole pieces 111 positioned adjacent to each other in the upper and lower directions and starting to simultaneously face the rotor salient poles 210.

A hollow cylinder-shaped magnetic insulator 150 is provided to be tightly fastened to the inner circumferential surface of the stator core 100, and wherein the shaft 140 is rotatably provided in an inner hollow of the magnetic insulator 150.

The stator yoke 120 has a magnetic domain arrangement in the rotation shaft direction, the stator salient poles 110 have a radial magnetic domain arrangement, and the rotor salient poles 210 have a magnetic domain arrangement in the rotation shaft direction.

The stator core 100 includes a hollow first stator yoke 120a formed of a pure iron ferromagnetic body or a compressed powder ferromagnetic body having a magnetic domain arrangement in the rotation shaft direction, and second stator yokes 120b each formed of a silicon steel plate having salient pole pieces 111 isotropic-rectangularly on an outer circumferential surface along a circumferential direction, wherein the second stator yokes 120b, respectively, are fitted over a top and bottom of the first stator yoke 120a to form the slot 112 between upper and lower salient pole pieces 111.

According to the present invention configured as described above, since the coil 130 is wound to pass through the space between the upper and lower salient pole pieces 111 after forming slots 112 in the stator salient poles 110 in the circumferential direction, coil winding work may be simplified by performing coil winding along the outer circumferential surface of the stator core 100. No separate room is required for coil winding, thus sliming it down. A smaller number of parts are required, thus leading to more hardness and durability. By forming a magnetic circuit of a magnetic field created as the stator salient poles and the rotor salient poles circulate the coil, the magnetic path may be minimized, allowing for minimized magnetic loss and Eddy current loss.

BRIEF DESCRIPTION OF THE DRAWINGS

FIG. 2 illustrates a perspective view (a) and a side cross-sectional view (b) of an outer-rotator-type switched reluctance motor according to a first embodiment of the present invention.

FIG. 12 is a plan view virtually illustrating changes in relative positions of a stator core 100 and a rotor core 200.

DETAILED DESCRIPTION OF EMBODIMENTS

The terms as used herein are defined prior to describing embodiments of the present invention.

The term "align(ment)" refers to a state in which the center of a stator salient pole is consistent with the center of a rotor salient pole to maximize the area where the salient poles face each other with an air gap therebetween. When the switched reluctance motor is actually operated, the state in which the center of the rotor salient pole is positioned within a predetermined rotation angle range from the center of the stator salient pole is defined as an aligned state.

The term "non-align(ment)" refers to a state in which the center of a rotor salient pole faces a mid-point between two stator salient poles positioned adjacent to each other in a circumferential direction and may actually refer to a state in which an area where the stator salient pole faces the rotor salient pole starts to occur from a state in which there is no area where the stator salient pole and the rotor salient pole face each other. The term "non-align" may otherwise refer to a state that comes slightly earlier than when the rotor salient pole starts to face the stator salient pole.

The term "magnetic circuit" refers to a closed circuit where a magnetic flux created by the coil wound around the stator core passes through the air gap and runs around the stator core and the rotor core.

The term "rotation shaft direction" refers to a longitudinal direction of a shaft that functions as a rotational axis of the rotator and includes a direction parallel with the shaft.

Hereinafter, preferred embodiments of the present invention are described with reference to the accompanying drawings in such a way to be easily practiced by one of ordinary skill in the art.

<Single-Phase Switched Reluctance Motor>

Figure 1:
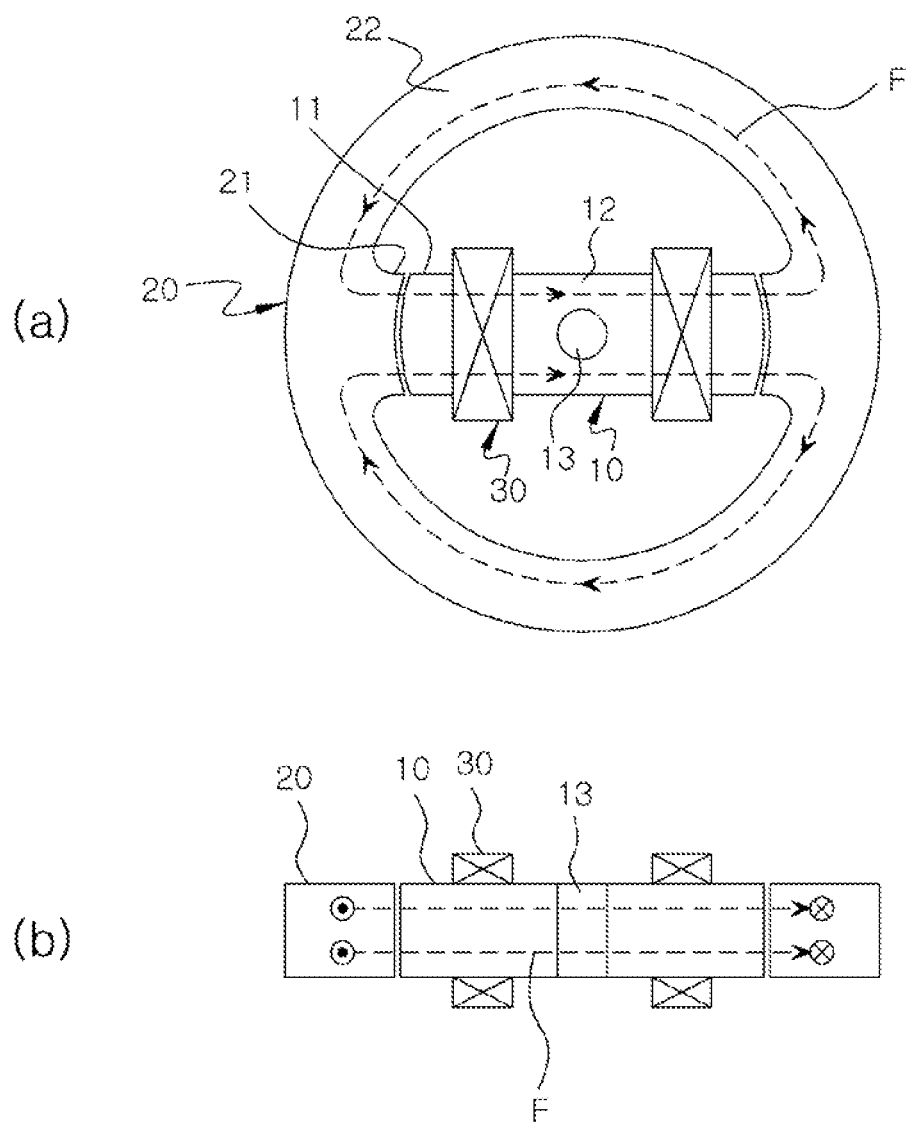
FIG. 1 illustrates a plan cross-sectional view (a) and a side cross-sectional view (b) of a conventional outer-rotator-type switched reluctance motor.
Figure 3:
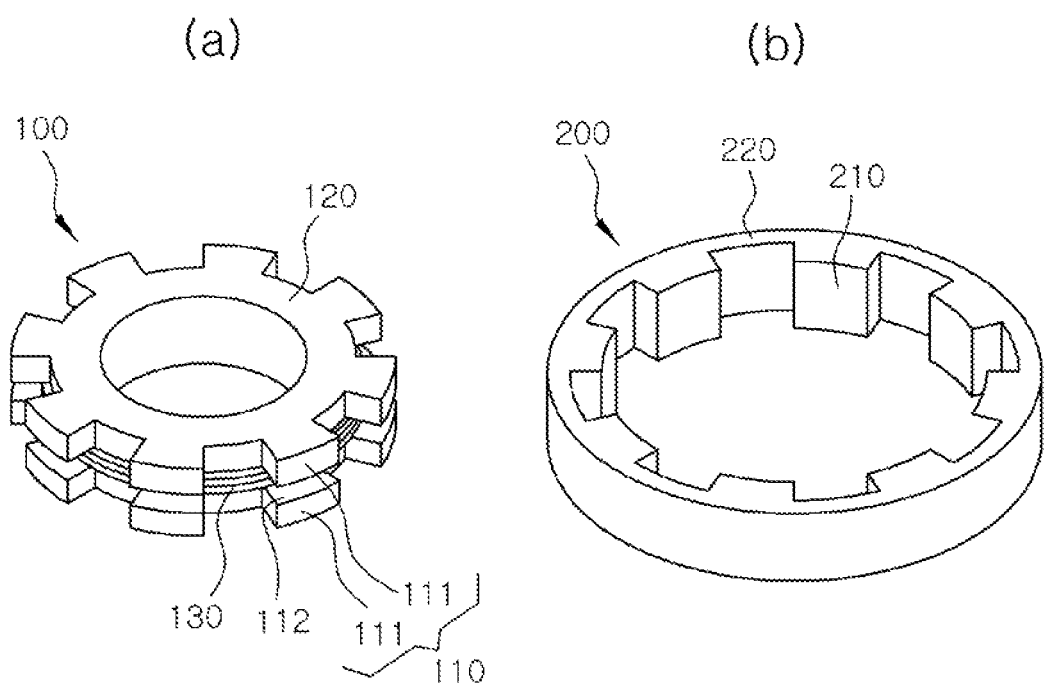
FIG. 3 illustrates a perspective view (a) of a stator core and a perspective view (b) of a rotator core among components of an outer-rotator-type switched reluctance motor according to the first embodiment of the present invention.
Figure 4:
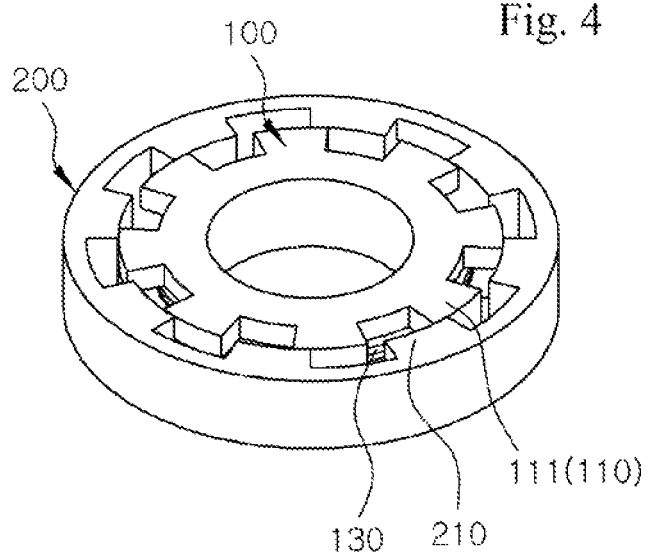
FIG. 4 is a top perspective view illustrating an assembly of a stator core and a rotor core among components of an outer-rotator-type switched reluctance motor according to the first embodiment of the present invention.
Figure 5:
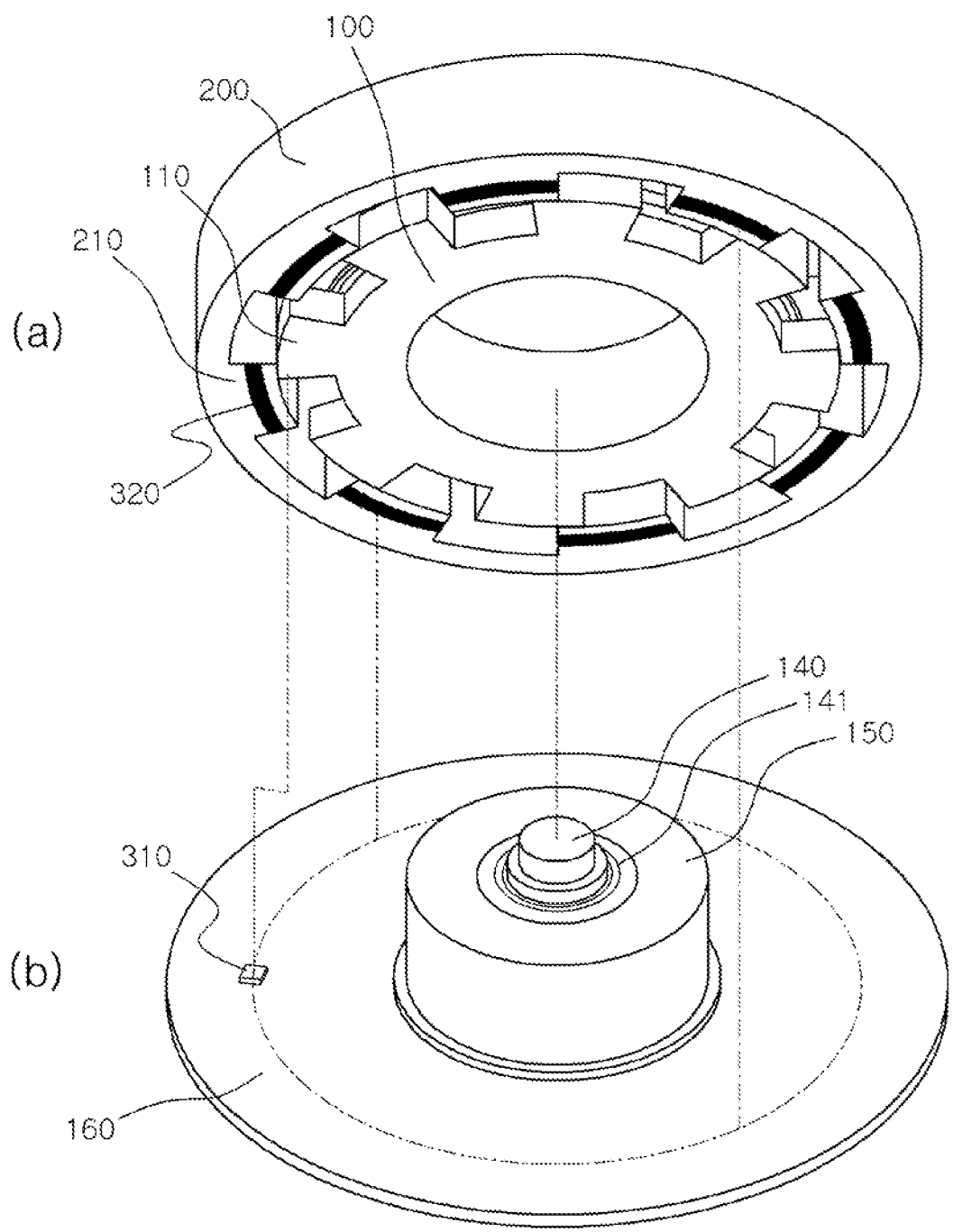
FIG. 5 illustrates a bottom perspective view (a) of the assembly of the stator core and the rotor core shown in FIG. 4 and a top perspective view of a stator base among components of the stator.

FIGS. 2 to 5 are views illustrating an outer-rotator-type switched reluctance motor according to a first embodiment of the present invention. FIG. 2 illustrates a perspective view (a) and a side cross-sectional view (b) of an outer-rotator-type switched reluctance motor according to a first embodiment of the present invention. FIG. 3 illustrates a perspective view (a) of a stator core and a perspective view (b) of a rotator core among components of an outer-rotator-type switched reluctance motor according to the first embodiment of the present invention. FIG. 4 is a top perspective view illustrating an assembly of a stator core and a rotor core among components of an outer-rotator-type switched reluctance motor according to the first embodiment of the present invention. FIG. 5 illustrates a bottom perspective view (a) of the assembly of the stator core and the rotor core shown in FIG. 4 and a top perspective view of a stator base among components of the stator.

According to the present invention, the switched reluctance motor is of an outer rotor type and includes a stator core 100, a rotator core 200, a position detecting means 300, and a controller 400. According to the first embodiment of the present invention as shown in FIGS. 2 to 5, the switched reluctance motor is a single-phase motor having a single coil 130 wound around the stator core 100.

The stator core 100 includes a cylindrical stator yoke 120 having a center portion bored therethrough in upper and lower directions, a plurality of stator salient poles 110 formed isotropic-rectangularly on the outer circumferential surface of the stator yoke 120 (or at equidistant intervals along the circumferential direction), and a coil 130 receiving electricity to create a magnetic flux. In the embodiment shown in the drawings, the motor is an eight-pole motor having eight stator salient poles 110, and the rotator core described below also has eight rotor salient poles 210.

According to the present invention, each stator salient pole 110 is cut to have a predetermined width along the circumferential direction of the stator yoke 120 to have a depressed slot 112. Accordingly, each stator salient pole 110 includes two salient pole pieces 111 separated from each other.

The coil 130 is wound around the outer circumferential surface of the stator yoke 120 along the circumferential direction thereof to sequentially pass through the respective slots 112 of the stator salient poles 110. Here, the coil 130 is wound only in the slots 112 not to extend beyond the salient pole pieces 111.

Thus, as electricity flows to the coil 130, a magnetic field is created to circulate the coil 130 in the slots 112, and thus, the inside of the slots 112 of the stator yoke 120 and the upper and lower salient pole pieces 111 radially projecting form a magnetic circuit to allow the magnetic flux to concentrate.

Here, the slots 112 are cut to the height of the stator salient poles 110 (i.e., the height of the upper and lower salient pole pieces) so that the coil 130 may be brought in tight contact with the outer circumferential surface of the stator yoke 120. Accordingly, the coil 130 may be stably wound, and the magnetic flux created around the coil 130 passing between the two stator salient poles 110 in the circumferential direction may concentrate through the stator yoke 120 to the stator salient poles, thereby allowing the magnetic flux created by the coil 130 to maximally concentrate in the ends of the stator salient poles 110 (i.e., the ends of the upper and lower salient pole pieces facing the rotor salient poles).

To further concentrate the magnetic flux created by the coil 130 in the ends of the stator salient poles 110, the stator yoke 120 may be provided with a magnetic domain arrangement in the rotation shaft direction (i.e., the longitudinal direction of the shaft), and the stator salient poles 110 may be provided with a magnetic domain arrangement that radially extends from the rotation axis (i.e., the shaft).

In the rotator core 200 described below, the rotor salient poles 210 may be provided with a magnetic domain arrangement in the rotation shaft direction. Thus, when the rotor salient poles 210 face the stator salient poles 110, the magnetic resistance in the magnetic circuit circulating the coil 130 may be minimized, and the magnetic energy from the air gaps between the rotor salient poles 210 and the stator salient poles 110 may be maximized.

For the above-described magnetic domain arrangements, the stator core 100 may be configured as follows.

For example, a compressed powder core is prepared to fit the shape of the stator core 100 including the stator yoke 120 and the stator salient poles 110. Upon forming, a magnetic field is applied to present a magnetic domain arrangement as described above. The stator core 100 prepared thusly is rendered to have the above-described magnetic domain arrangement when an electric current is applied to the coil winding 130, thus leading to a reinforced magnetic field. The rotor yoke 200 may be made in the same manner. Such compressed powder cores are proper for manufacturing cores for low-capacity motors. Low-capacity motors may be manufactured of compressed powder cores having an unoriented magnetic domain arrangement since they would present a small difference in magnetic leakage even when made so.

As another example, the cores may be formed of a laminate of thin iron cores (e.g., a silicon steel laminate) and may be configured so that magnetic paths by the magnetic domain arrangement are achieved by each iron core. In this case, the salient poles and the yokes may be separately manufactured, and the salient poles may be fitted in the yokes. This method is proper for manufacturing cores for high-capacity motors.

The stator core 100 should be fastened where the motor is installed so that the stator core 100 remains still. Further, the stator core 100 should rotatably support the rotator core 200 described below.

According to an embodiment of the present invention, the stator core 100 includes a magnetic insulator 150 shaped as a hollow pipe and tightly fastened to an inner surface of the stator yoke 120, a shaft 140 vertically fitted into the magnetic insulator 150 through the inner hollow of the magnetic insulator 150 to be rotated on a bearing positioned in the inner hollow, and a plate-shaped stator base 160 extending from the magnetic insulator 150. The stator base 160 may be integrally formed with the magnetic insulator 150 or may fit and fasten the magnetic insulator 150 under the stator core 100 to hold the motor in the position where the motor is installed.

Although the shaft 140 may be directly mounted in the inner hollow of the stator yoke 120 to be rotated, the stator core 100 is supported by the magnetic insulator 150 fastened to the stator base 160, and the stator core 100 is magnetically insulated from the shaft 140 and the stator base 160 in the instant embodiment.

The magnetic insulator 150 may be a non-magnetic body with a thickness enough to provide sufficient magnetic insulation while stably holding the stator core 100 with its bottom fastened to the stator base 160. Further, the magnetic insulator 150 may absorb shocks as compared with the stator core 100 formed of a ferromagnetic body. For example, the magnetic insulator 150 may be configured by forming a resin to meet the conditions of such strength and hardness as to be able to stably and rotatably hold the shaft 140 not to be inclined in the inner hollow while preventing the stator core 100 tightly fastened to the outer circumferential surface from moving.

The magnetic insulator 150 configured as such may prevent magnetic impacts occurring when electric current flows to the coil 130 while switched on/off at a high frequency from transferring to the state base 160 and the shaft 140 and may absorb vibration of the stator core 100 due to magnetic impacts, thus sharply reducing the noise of the switched reluctance motor according to the present invention.

The shaft 140 is configured so that its top projects slightly beyond the top of the magnetic insulator 150 and is fastened to the top of the rotator frame 230 described below.

The stator base 160 is formed of a plate that may face, at least, the overall bottom of the stator core 100, so as to allow the position detecting sensor 310 to be installed on the top thereof.

Meanwhile, according to the present invention, the shaft 140 may be fastened to the magnetic insulator 150 or may be integrally formed with the magnetic insulator 150 so that the rotator frame 230 described below may be rotatably mounted on the top of the shaft 140. It should be appreciated that such configuration is also included in the concept of the present invention. However, the embodiment has been described where the shaft 140 passes through the magnetic insulator 150 and is rotatable for stable rotation of the rotator core 200.

The rotator core 200 includes a hollow rotor yoke 220 surrounding the outside of the stator core 100 and a plurality of rotor salient poles 210 projecting isotropic-rectangularly on the inner circumferential surface of the rotor yoke 220 along the circumferential direction thereof to respectively face the stator salient poles 110.

Here, the rotor salient poles 210 face the stator salient poles 110 with air gaps disposed therebetween. The end portion of each rotor salient pole 210 has such a size and area as to cover both the two salient pole pieces 111 separated in upper and lower directions, so that an upper portion of the rotor salient pole 210 faces the upper salient pole piece, a lower portion thereof faces the lower salient pole piece, and a middle portion thereof faces the coil 130 running across the slot 130.

A rotator frame 230 is further provided to surround and hold the outer circumferential surface of the rotator core 200. The rotator frame 230 has a top plate covering the top portion of the rotator core 200 with an interval provided between the top plate and the top portion of the rotator core 200. Here, the center of the top plate of the rotator frame 230 is fastened to the top end of the shaft 140 to allow the rotator core 200 to rotate about the stator core 100.

The position detecting means 300 is a component to sense a rotational position of the rotator core 100. Referring to FIG. 5, the position detecting means 300 includes a sensed target 320 installed on the bottom surface of the rotator core 200 and a position detecting sensor 310 installed on the top surface of the stator base 160.

The sensed target 320 is formed to be consistent with the position of a lower surface on a vertical line passing through a start point of a rotation direction of the rotor salient pole 210 (rotation direction of the rotator core) and the position of a lower surface of a vertical line passing through an end of the rotational direction of the rotor salient pole so as to recognize the start and end points of the rotation direction of the rotor salient pole. In a specific embodiment, the sensed target is formed as a circular arc-shaped strap fitting a section whose end points are the positions of both the lower surfaces. One sensed target 320 is formed for each rotor salient pole.

The position detecting sensor 310 is mounted on the stator base 160 extending from the magnetic insulator 150 fastening the stator core 100 and is installed to be placed on a vertical line passing one of both ends along the circumferential direction of the stator salient pole, which starts to first face the rotor salient pole as the rotator core rotates. The position detecting sensor 310 senses the start and end of the sensed target 320. Here, the position detecting sensor 310 and the sensed target 320 are radially formed or installed preferably at the same radius from the shaft 140.

In case the sensed target 320 is formed of a permanent magnet, the position detecting sensor 310 may be formed of a hall sensor to sense a magnetic field created by the permanent magnet.

In case the sensed target 320 is formed of a reflecting mirror, the position detecting sensor 310 may be formed of a photo-sensor that senses light radiated to the bottom surface of the rotator core 100 and reflected by the reflecting mirror.

Here, the sensed target 320 may be formed thin on the bottom surface of the rotator core 200 by a printing technique. Thus, the sensed target 320 may be formed on the rotator core 100 without increasing the volume.

Meanwhile, position detecting sensors 310, respectively, are installed at the positions respectively corresponding to both rotation-directional ends of any one rotor salient pole.

Of course, in a multi-phase structure, two position detecting sensors are installed per phase.

The controller 400 switches on or off application of electricity to the coil 130 at the time of sensing by the position detecting sensor 310. That is, since the position detecting sensor 310 generates pulse signals from the time when the rotor salient poles 210 in the non-aligned state start to face the stator salient poles 110 to the time when the rotor salient poles 210 are aligned with the stator salient poles 110, the controller generates a positive torque by applying electricity to the coil 130 during a time period corresponding to the time that the position detecting sensor 310 senses the pulse signal, i.e., within the time period during which the stator salient poles 110 and the rotor salient poles 210 change from the non-aligned state to the aligned state. Such controlling method as to generate a positive torque by applying electricity according to relative positions between the rotor salient poles 210 and the stator salient poles 110 is a known technique, and the driving scheme is also known. No detailed description is given of the technique of adjusting the timing of applying electricity.

As described above, in the switched reluctance motor according to the present invention, a magnetic field is created by the annular coil 130 wound and circulating around the outer circumferential surface of the stator core 100 with respect to the shaft, and a magnetic circuit is created by the two salient pole pieces 111 positioned over and under the coil 130, the portion of the stator yoke between the two salient pole pieces 111, and the rotor salient pole 210 facing the two salient pole pieces 111. Thus, the magnetic circuit circulating the coil 100 is rendered to be short, thus leading to minimized magnetic resistance in the core and core loss and maximized use efficiency to convert magnetic energy into the force of actuating the motor. Further, the stator core and the rotator core may be manufactured more compact.

Since the switched reluctance motor is an outer-rotor-type motor, and the coil 130 is wound around the outer circumferential surface of the stator core while put in the slots 112 of the stator salient poles 110, winding the coil 130 may be easily done, and the wound coil 130 may remain in a stable position. Thus, the switched reluctance motor may be simplified in structure, sturdy, and highly durable.

Further, since the position detecting means 300 to sense a rotational position of the rotator core 200 does not fasten a separate disc to the rotator core 200, and the sensed target 320 is formed on the bottom surface of the rotator core 100, they may be installed with no increase in volume.

<Multi-Phase Switched Reluctance Motor>

FIGS. 6 to 9 are views illustrating second, third, and fourth embodiments of the present invention. N stator cores 100 and N rotator cores 200 (where N>1) as illustrated in FIGS. 3 and 4 are provided, with annular magnetic insulators 170 and 240 interposed therebetween, to have a stacked structure along the rotation shaft direction of the shaft 140. The N stator cores 100 are stacked with the rotor salient poles 110 aligned in line with each other along the rotation shaft direction, and the N rotator cores 200 are provided so that the rotor salient poles 210 have different mechanical angles (or electrical angles) so that the electrical currents respectively applied to the coils 130 wound the stator cores 100 have a phase difference.

The above-mentioned difference in the mechanical angles becomes an angle obtained by dividing the rotation angle between two rotor salient poles 210 positioned adjacent in the circumferential direction in any one rotator core 200 by N. When stacking the rotator cores 200 sequentially in stacking order, the subsequent rotator core 200 is stacked on its previous rotator core 200 to be put ahead thereof by the above-mentioned mechanical angle, so that the N rotator cores may be arranged skewed.

Figure 7:
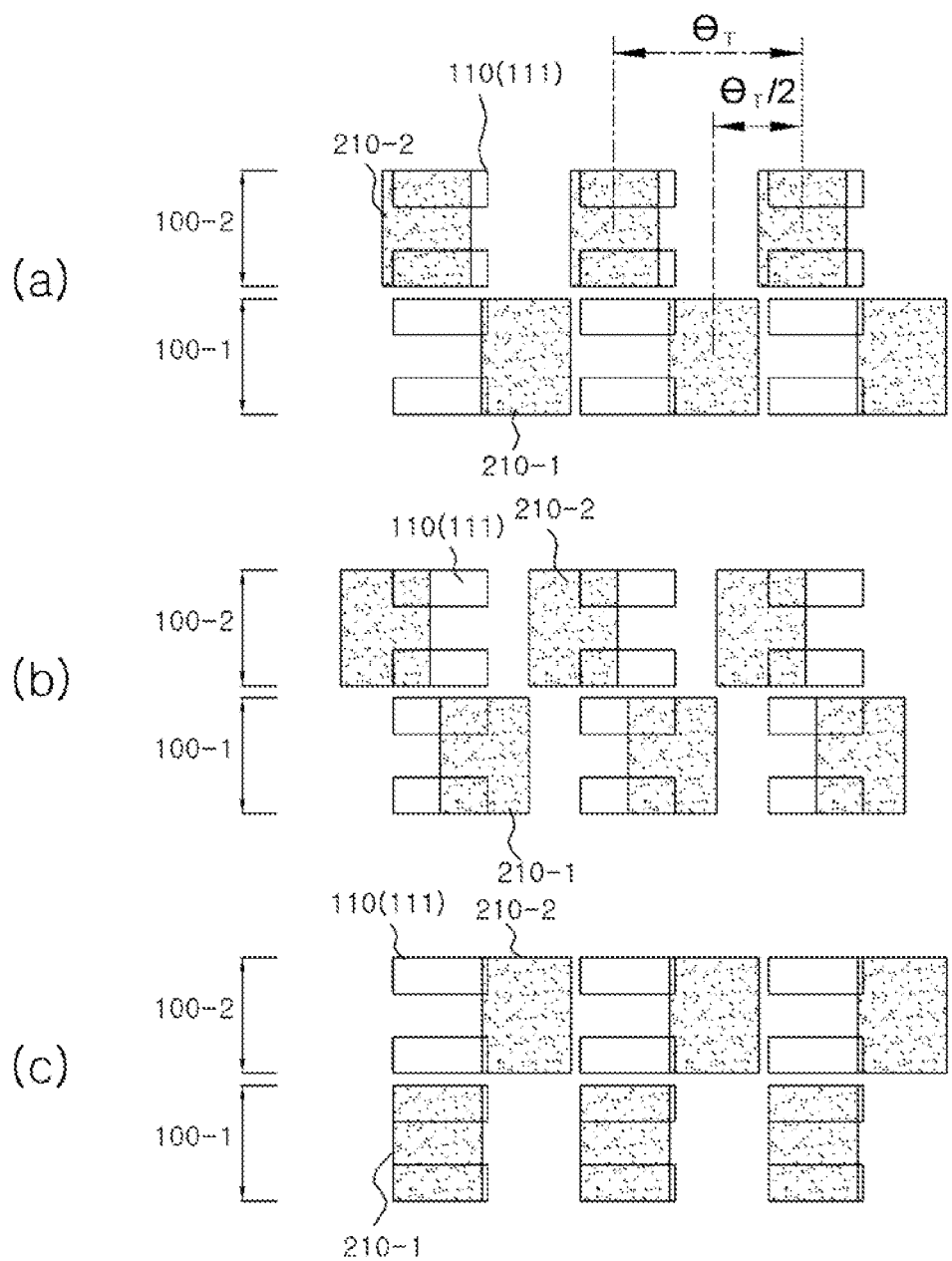
FIG. 7 is a plan view virtually illustrating changes in relative positions of a stator core 100 and a rotor core 200.

Here, the rotation angle (OT) between the two rotor salient poles 210 positioned adjacent to each other in the circumferential direction is a value obtained by dividing 360° by the number of rotor salient poles provided in any one rotator core, i.e., the number of rotor salient poles arranged along the circumferential direction as shown in FIG. 7, and this corresponds to the pole pitch between the salient poles.

Thus, the N rotor salient poles may be stepped at an interval corresponding to the upper-lower thickness of the annular magnetic insulator 240 in the inner circumferential surface of the N stacked rotator cores 200. A plurality of such steps may be formed along the circumferential direction of the inner circumferential surface, and each rotor salient pole 210 is disposed on each vertical line passing through the position obtained by dividing the rotation angle between the two rotor salient poles 210 positioned adjacent to each other in the circumferential direction by N.

The above-mentioned phase difference is a difference in the timing of applying electric current.

Further, although not shown in the drawings, the sensed targets 320 of the position detecting means 300 may be formed on the bottom surface of the lowest rotator core 200 of the stack of the rotator cores 200. The sensed targets 320, respectively, may be formed on N concentric circles to correspond to the N rotator cores 200, respectively. Further, N position detecting sensors 310 respectively corresponding to N sensed targets 320 are mounted on the top surface of the stator base 160.

Thus, salient poles are sequentially aligned as the N rotator cores are simultaneously rotated. Accordingly, the increased output and reduced noise may be obtained, as compared with when the motor is configured as a single-phase motor, by applying electricity to the coil 130 of each stator core 100 while leaving a phase difference to fit the rotational position of each rotator core sensed by the N position detecting sensor 310.

Here, since the shaft 140, the magnetic insulator 150, and the rotator frame 230 may have such a shape as to extend upwards to correspond to the number of stacked stator cores 100 and rotator cores 200. Thus, the description focused only on the stacked structure of the stator cores 100 and the rotator cores 200.

A specific embodiment is described below.

Figure 6:
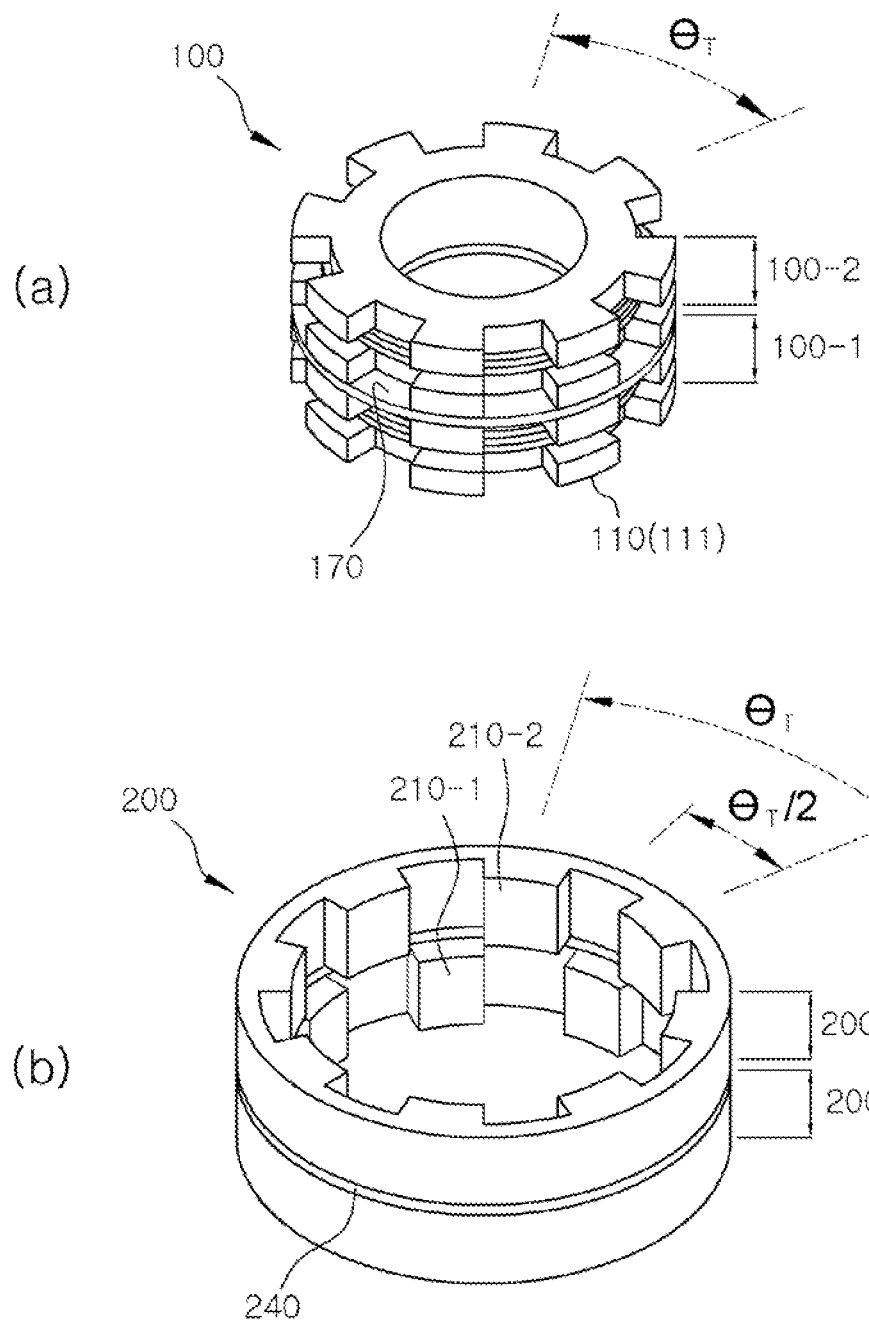
FIG. 6 illustrates a perspective view (a) of a stator core and a perspective view (b) of a rotator core among components of an outer-rotator-type switched reluctance motor according to a second embodiment of the present invention.

FIG. 6 illustrates a perspective view (a) of a stator core and a perspective view (b) of a rotator core among components of an outer-rotator-type switched reluctance motor according to a second embodiment of the present invention. FIG. 7 is a plan view virtually illustrating changes in relative positions of stator cores 100 (100-1 and 100-2) and a rotator core 200 (200-1 and 200-2).

Referring to FIGS. 6 and 7, the stator core 100 includes a first stator core 100-1, a second stator core 100-2 stacked on the first stator core 100-1, with an annular magnetic insulator 170 disposed therebetween. The stator salient poles of the first stator core 100-1 and the stator salient poles of the second stator core 100-2 are placed along vertical lines.

The rotator core 200 includes a first rotator core 200-1 surrounding the first stator core 100-1 with an interval disposed therebetween and a second rotator core 200-2 surrounding the second stator core 100-2 with an interval disposed therebetween and stacked on the first rotator core 200-1 with an annular magnetic insulator 240 disposed between the first rotator core 200-1 and the second rotator core 200-2. A plurality of rotor salient poles forming a two-step shape are provided along the circumferential direction on the inner circumferential surface of the rotator core 200, wherein there is an interval between the two steps. In this embodiment, since the motor has an eight-pole structure, the difference (OT) in the mechanical angle between the respective centers of the two rotor salient poles positioned adjacent in the circumferential direction of any one stator core (100-1 or 100-2) is 360/8=45°.

Thus, the difference (θT/N, N=2) in the mechanical angle between the rotor salient poles 210-1 of the first rotator core 200-1 and the rotor salient poles 210-2 of the second rotator core 200-2 is 45/2=22.5°.

Upon actuating the motor to rotate, electricity is applied to the coil of the first stator core 100-1 at the time when the rotor salient poles 210-1 of the first rotator core 200-1 face the stator salient poles of the first stator core 100-1 (FIG. 7a), and after the area where they face each other has gradually increased (FIG. 7b), the application of electricity is stopped at the time of being aligned, and right after, the second rotator core 200-2 is delayed by the difference in mechanical angle, 22.5°, from the first rotator core 200-1, starting to face the second stator core 100-2 (FIG. 7c), and electricity is thus applied to the coil of the second stator core 100-2 as shown in FIG. 7.

Figure 8:
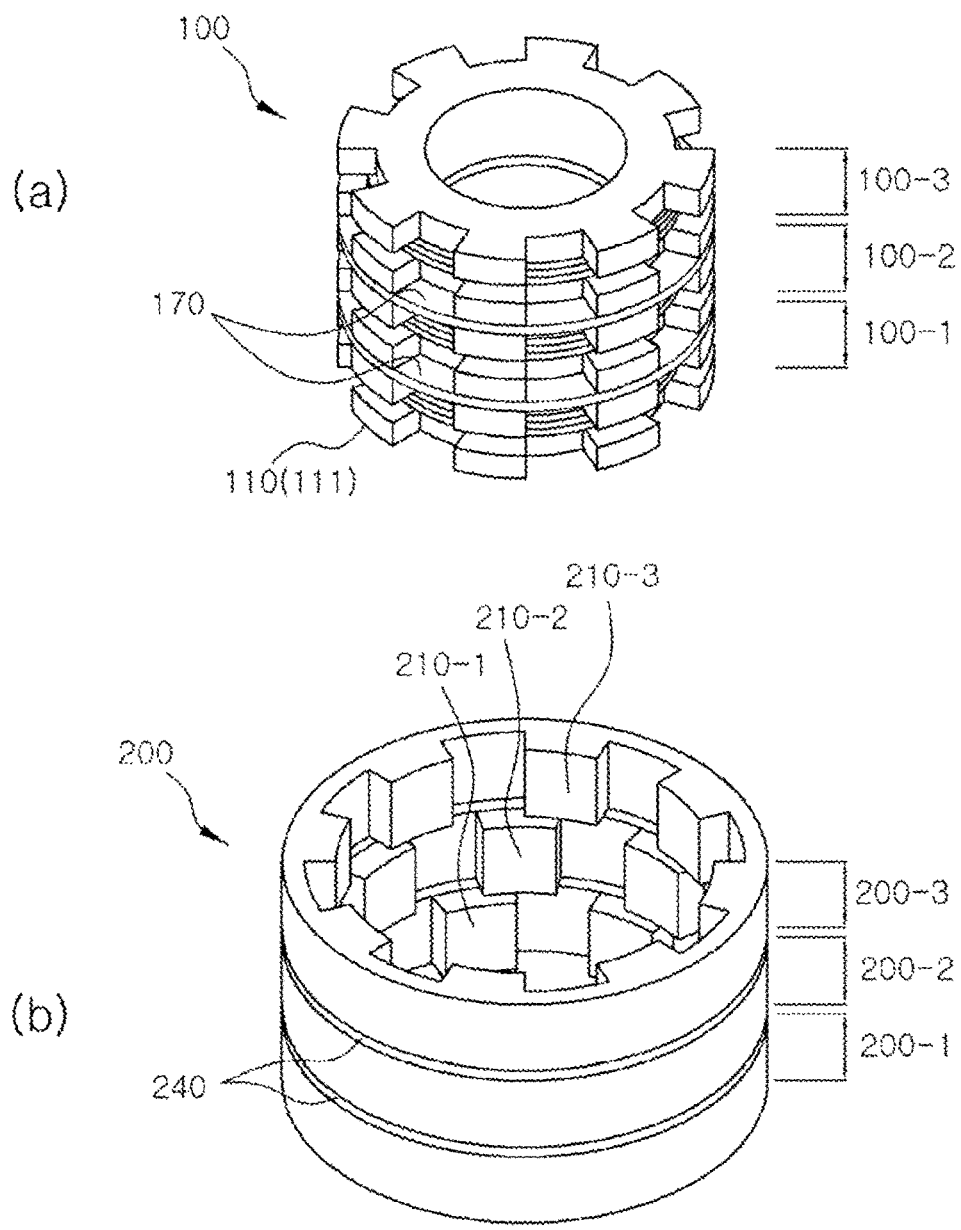
FIG. 8 illustrates a perspective view (a) of a stator core and a perspective view (b) of a rotator core among components of an outer-rotator-type switched reluctance motor according to a third embodiment of the present invention.

FIG. 8 illustrates a perspective view (a) of a stator core and a perspective view (b) of a rotator core among components of an outer-rotator-type switched reluctance motor according to a third embodiment of the present invention.

According to the third embodiment of the present invention, the stator core 100 includes three stator cores 100-1, 100-2, and 100-3 stacked one over another and annular magnetic insulators 170 arranged between the three stator cores 100-1, 100-2, and 100-3. The stator salient poles 110 form eight rows of salient poles on the outer circumferential surface thereof and aligned in line along the rotation shaft direction. That is, an eight-pole structure is formed.

The rotator core 200 has also such a structure in which three rotator cores 200-1, 200-2, and 200-3 respectively corresponding to the three stator cores 100-1, 100-2, and 100-3 are stacked one over another with annular magnetic insulators 240 disposed therebetween. Rotor salient poles 210-1, 210-2, and 210-3 are arranged one over another in a stepped shape to be respectively located at the positioned obtained by dividing the rotation angle between two rotor salient poles positioned adjacent to each other in the circumferential direction. In the instant embodiment, since the motor has an eight-pole structure, the difference in the mechanical angle between rotor salient poles positioned adjacent to each other in upper and lower directions is 45/3°.

In such a three-phase structure, upon applying electricity to coils respectively provided in the three stator cores 100-1, 100-2, and 100-3, the application of electricity is sequentially performed at a time gap corresponding to the difference in the mechanical angle, 45/3°. As shown in the drawings, since the interval between two rotor salient poles positioned adjacent to each other in the circumferential direction is substantially similar to the circumferential-directional length of the stator salient pole, the multi-phase structure has a section where the rotor cores 210-1, 210-2, and 210-3 arranged in upper and lower directions overlap each other, and thus, there may occur a time period during which electricity is applied to two of the three coils. However, the mutual interference may be minimized by the magnetically insulating annular magnetic insulators 170 and 240.

Figure 9:
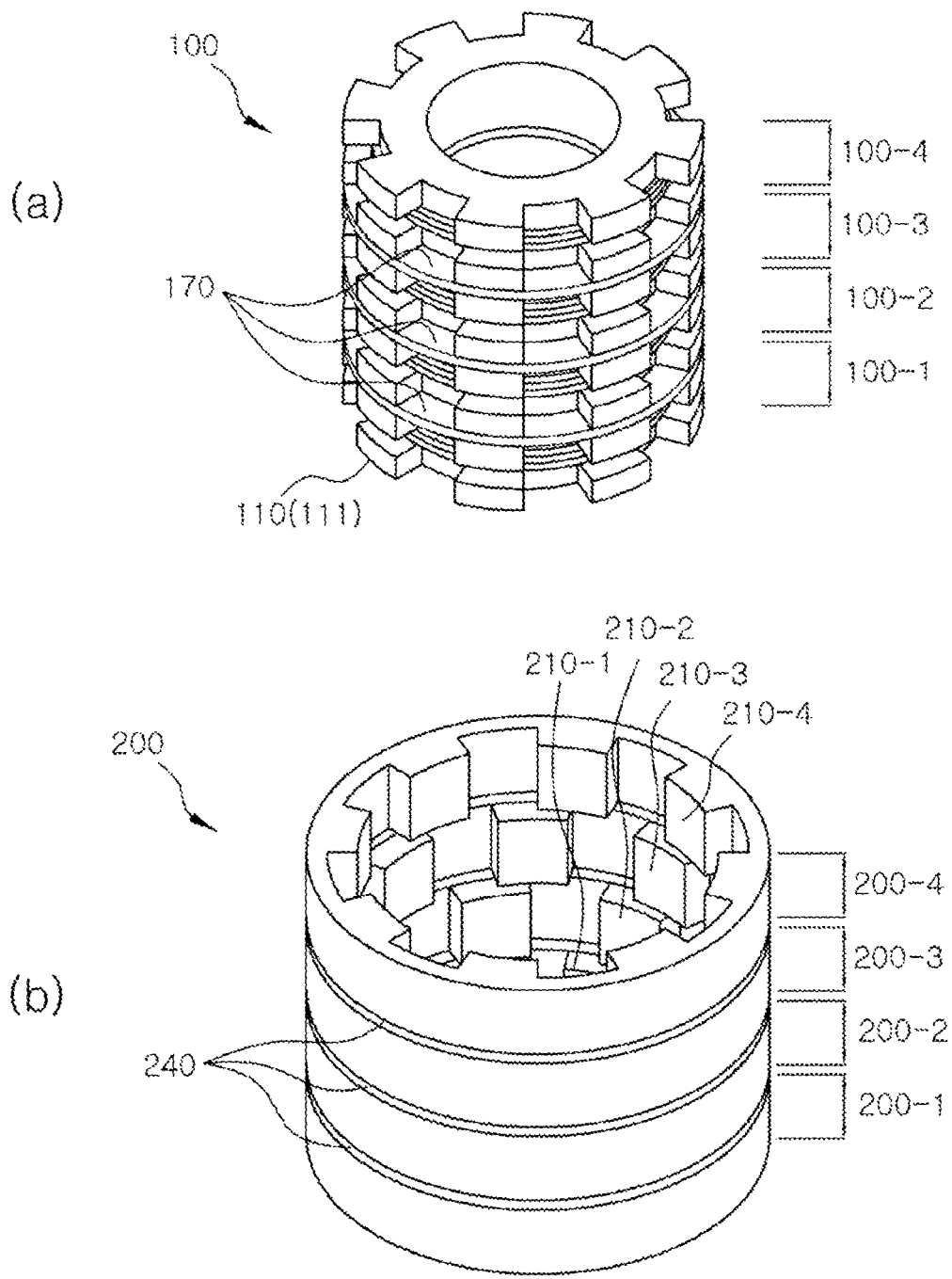
FIG. 9 illustrates a perspective view (a) of a stator core and a perspective view (b) of a rotator core among components of an outer-rotator-type switched reluctance motor according to a fourth embodiment of the present invention.

FIG. 9 illustrates a perspective view (a) of a stator core and a perspective view (b) of a rotator core among components of an outer-rotator-type switched reluctance motor according to a fourth embodiment of the present invention.

In the fourth embodiment of the present invention, since it is a four-phase structure in which each phase has eight poles, the stator core 100 is configured so that four stator cores 100-1, 100-2, 100-3, and 100-4 are stacked one over another so that the stator salient poles are aligned in line with one another.

The rotator core 200 includes four rotator cores 2001, 200-2, 2003, and 2004 stacked one over another, wherein the rotor salient poles are respectively arranged on vertical lines passing through the positions obtained by dividing the rotation angle, 360/8=45°, between the rotor salient poles 210 positioned adjacent to each other in the circumferential direction by 4, thus forming a discrete four-step structure of rotor salient poles 210-1, 210-2, 210-3, and 210-4.

Like in the three-phase structure, although there are a plurality of coils to simultaneously apply electricity also in the four-phase structure, the mutual interference may be minimized by the magnetically insulating annular magnetic insulators 170 and 240.

Figure 10:
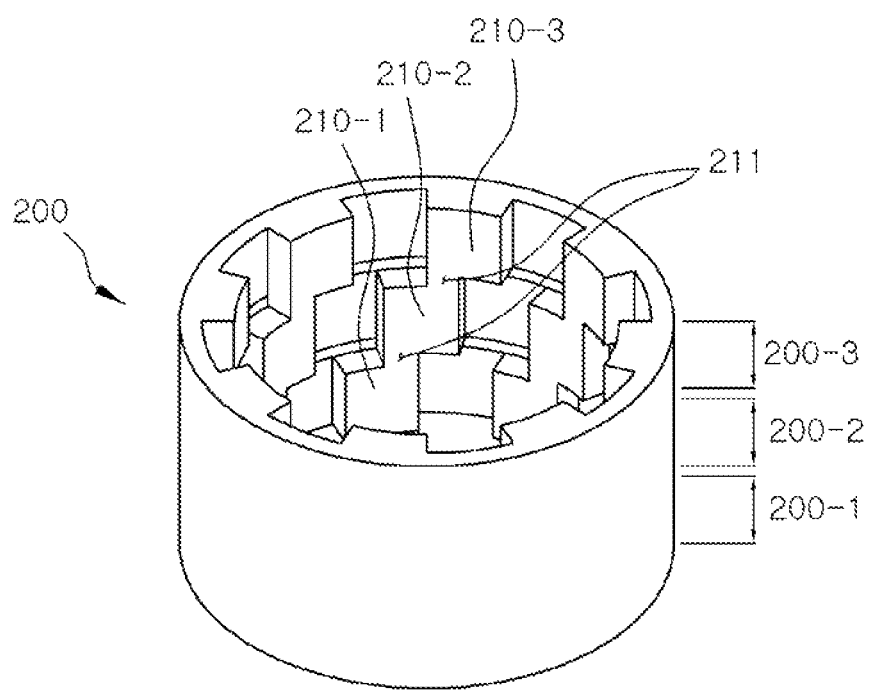
FIG. 10 is a perspective view illustrating a rotator core among components of an outer-rotator-type switched reluctance motor according to a fifth embodiment of the present invention.

FIG. 10 is a perspective view illustrating a switched reluctance motor according to a fifth embodiment of the present invention, wherein a three-phase structure of rotator cores is shown.

In the second, third, and fourth embodiments of the present invention, a plurality of stator cores and a plurality of rotator cores are stacked one over another with annular magnetic insulators 170 and 240 disposed therebetween so that intervals occur between the rotor salient poles arranged in upper and lower directions. In the fifth embodiment of the present invention, however, the rotator core 200 is formed not by stacking a plurality of rotator cores but in such a manner that a plurality of rotator cores corresponding to N phases are integrally formed wherein rotor salient poles respectively corresponding to N-phase stator salient poles are stepwise formed along the rotation shaft direction on the inner circumferential surface of the single body, and the stepwise arranged rotor salient poles are continuous to one another at the overlapping portions thereof.

Referring to FIG. 10 illustrating a three-phase rotator core, the rotor salient poles 210-1, 210-2, and 210-3 arranged stepwise include connecting pieces 211 connecting the portions facing in the vertical direction so that the rotor salient poles 210-1, 210-2, and 210-3 are formed in a continuous stepwise shape. A plurality of rotator cores are not stacked one over another nor is the annular magnetic insulator 240 used, and instead, a single-body rotator core is formed. That is, stepwise rotor salient poles continuous to one another in upper and lower directions are formed on the inner circumferential surface of the hollow-cylindrical rotor yoke.

By the stepwise rotor salient poles formed thusly, when a magnetic field acts through any one rotor salient pole while another magnetic field is applied to another adjacent underneath rotor salient pole, combined magnetic flux may be generated by the two magnetic fields, and there thus occurs magnetic damping that mitigates magnetic impacts when the magnetic field is applied to the other rotor salient pole. Thus, upon sequentially supplying electric currents to the plurality of coils wound around the stator core 100 at a phase difference, the impacts may be mitigated by the magnetic damping at the time of supplying the currents, resultantly mitigating the structural noise issue of the switched reluctance motor. In other words, according to the principle of the switched reluctance motor, electricity is periodically applied to the coils to generate torque while applying the electricity, and thus, torque ripples may occur. According to the present invention, however, the torque ripples may be reduced by the magnetic damping at the time of applying the electricity.

Meanwhile, in the second embodiment of the two-phase structure as shown in FIG. 6, the rotor salient poles 210-1 and 210-2 arranged skewed in upper and lower directions do not have any surface where they face each other, and in this case, they may thus be formed to be continuous to each other in a diagonal direction.

<Single-Body Core Structure>

Referring to FIGS. 11 to 15, the stator core 100 and the rotator core 200 each has a multi-phase structure and are formed not in a stacked structure but in a single-body structure.

First, the stator core 100 is formed to have stator salient poles 100 arranged along the circumferential direction and N (N>2) slots 112 formed in the stator salient poles 110 at an equidistant interval along the rotation shaft direction to form N+1 salient pole pieces arranged at an equidistant interval along the circumferential direction. Then, in the same manner as those described in connection with the above embodiments, coils are wound on the slots 112. That s, N coils wound around the periphery of the stator core 100 are provided along the rotation shaft direction.

Here, the stator core 100 is manufactured to have a height proportional to the number of the phases (i.e., the number of coils, N).

The rotator core 200 is shaped as a hollow cylinder of the same height as the stator core 100. N rotor salient poles 210 are shaped to have N steps along the rotation shaft direction each being aligned with two salient pole pieces 111 positioned adjacent to each other in upper and lower directions, and the N steps are stepwise continuous to each other.

Here, the interval in center between the steps positioned adjacent to each other in the upper and lower directions arises by an angle obtained by dividing the rotation angle between two stator salient poles positioned adjacent to each other in the circumferential direction by N.

The two steps is rendered to have an overlapping portion as long as the upper-lower height of the salient pole piece to be continuous to each other through the overlapping portion. Here, the overlapping portion means that one of the steps is removed as much as the overlapping portion and the steps are then fitted together, rather than meaning that the steps simply overlap each other. That is, the height of each step of the rotor salient pole 210 is the same and the steps are continuous to each other into a single body. Here, each step is a component corresponding to one rotor salient pole described above in connection with the first to fifth embodiments of the present invention.

By forming the rotor salient pole 210 as such, as the rotator core 200 is rotated, the two salient pole pieces positioned adjacent to each other in the upper and lower directions and simultaneously aligned with the rotor salient pole 210 are sequentially changed, and the steps simultaneously aligned are also changed in sequence.

Thus, the controller 400 may generate a positive torque according to the N-phase structure by stopping application of electricity, at least, before the aligned time for the salient pole pieces and after starting to apply electricity to the coil between the two salient pole pieces positioned adjacent to each other in the upper and lower directions that simultaneously start to face the rotor salient pole.

This is described in further detail with reference to the drawings.

Figure 11:
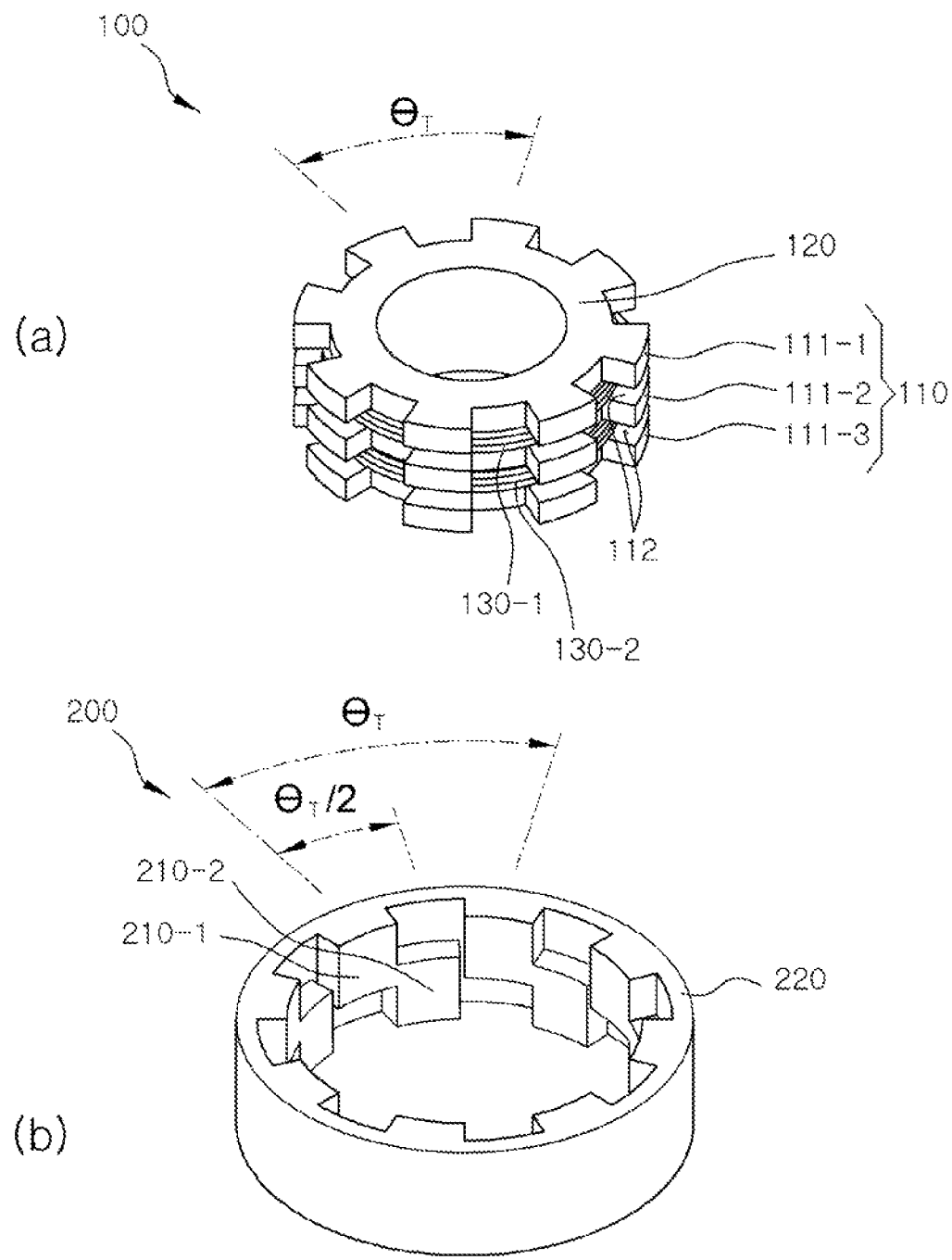
FIG. 11 illustrates a perspective view (a) of a stator core and a perspective view (b) of a rotator core among components of an outer-rotator-type switched reluctance motor according to a sixth embodiment of the present invention.

FIG. 11 illustrates a perspective view (a) of a stator core and a perspective view (b) of a rotator core among components of an outer-rotator-type switched reluctance motor according to a sixth embodiment of the present invention. FIG. 12 is a plan view virtually illustrating changes in relative positions of a stator core 100 and a rotor core 200.

The stator core 100 includes a hollow stator yoke 120 and eight stator salient poles 110 provided at equidistant intervals along the circumferential direction on the outer circumferential surface of the stator yoke 120, wherein each stator salient pole 110 is cut along the rotation shaft direction by two slots 112 formed at an equip-distant interval to have first, second, and third salient pole pieces 111-1, 111-2, and 111-3, and a first coil 130-1 is wound along the circumferential direction to pass through the space between the first and second salient pole pieces 111-1 and 111-2, and a second coil 130-2 is wound along the circumferential direction to pass through the space between the second and third stator salient poles 111-2 and 111-3.

The rotator core 200 has a hollow rotor yoke 220 having the same length as the stator core 100 and stepwise rotor salient poles formed on the inner circumferential surface of the rotor yoke 220.

Here, the stepwise rotor salient poles have a two-step structure, and a first rotor salient pole 210-1 having an area where it may simultaneously face the first and second salient pole pieces 111-1 and 111-2 and a second rotor salient pole 210-2 having an area where it may simultaneously face the second and third salient pole pieces 111-2 and 111-3 are arranged stepwise in the rotation shaft direction.

In the stepwise structure, since the angular difference (OT) between the two rotor salient poles 110 positioned adjacent to each other in the circumferential direction is 360/8=45°, the angular difference (θT/N, N=2) in the circumferential direction between the first rotor salient pole 210-1 and the second rotor salient pole 210-2 is 45/2°, they together face the second salient pole piece 111-2, and thus, the first rotor salient pole 210-1 and the second rotor salient pole 210-2 are structured to be abuttingly continuous to each other by the thickness of the second salient pole piece 111-2.

Eight stepwise rotor salient poles formed as such are formed along the circumferential direction on the inner circumferential surface of the rotator core. Here, the first rotor salient pole 210-1 and the second rotor salient pole 210-2 are rendered to have a predetermined arc angle with respect to the shaft (rotation axis), which is slightly smaller than those of the stator salient poles 110, so that the stepwise rotor salient poles are spaced apart from each other in the circumferential direction.

The rotation of the stator core 200 is described with reference to FIG. 12.

Since the first rotor salient pole 210-1 starts to simultaneously face the first salient pole piece 111-1 and the second salient pole piece 111-2 in the state shown in FIG. 12(*a*), electricity is applied to the first coil 130-1 between the first salient pole piece 111-1 and the second salient pole piece 111-2 to generate a positive torque. By contrast, since the second rotor salient pole 210-2 starts to depart from the state in which it is simultaneously aligned with the second salient pole piece 111-2 and the third salient pole piece 111-3, application of electricity to the second coil 130-2 between the second salient pole piece 111-2 and the third salient pole piece 111-3 causes a negative torque. Accordingly, the second coil 130-2 is left not to be applied with electricity.

By receiving the rotational force by the positive torque, the surface where the first rotor salient pole 210-1 faces the first salient pole piece 111-1 and the second salient pole piece 111-2 increases as shown in FIG. 12(b), and if the first salient pole piece 111-1 and the second salient pole piece 111-2 are simultaneously aligned as shown in FIG. 12(c), the electricity applied to the first coil 130-1 is cut off. At this time, since the second rotor salient pole 210-2 starts to have a surface where it faces the second salient pole piece 111-2 and the third salient pole piece 111-3, electricity is applied to the second coil 130-2 between the second salient pole piece 111-2 and the third salient pole piece 111-3 to generate a positive torque.

Thus, since the magnetic field by the first coil 130-1 is cut off and immediately thereafter a magnetic field by the second coil 130-2 is applied to the second stator salient pole 111-2, the magnetic hysteresis caused by the magnetic field from the first coil 130-1 has an influence on the application of electricity to the second coil 130-2 according to the ferromagnetic body hysteresis. Resultantly, magnetic impacts caused upon application of the magnetic field by the second coil 130-2 may be mitigated by magnetic damping, thereby leading to reduced noise.

Meanwhile, the electricity applied to the second coil 130-2 is stopped from application at the time that the second rotor salient pole 210-2 is aligned with the second and third salient pole pieces 111-2 and 111-3, and when turning into the state shown in FIG. 12(a), electricity is applied to the first coil 130-1, thereby generating a rotational force by repetitive positive torque.

Figure 13:
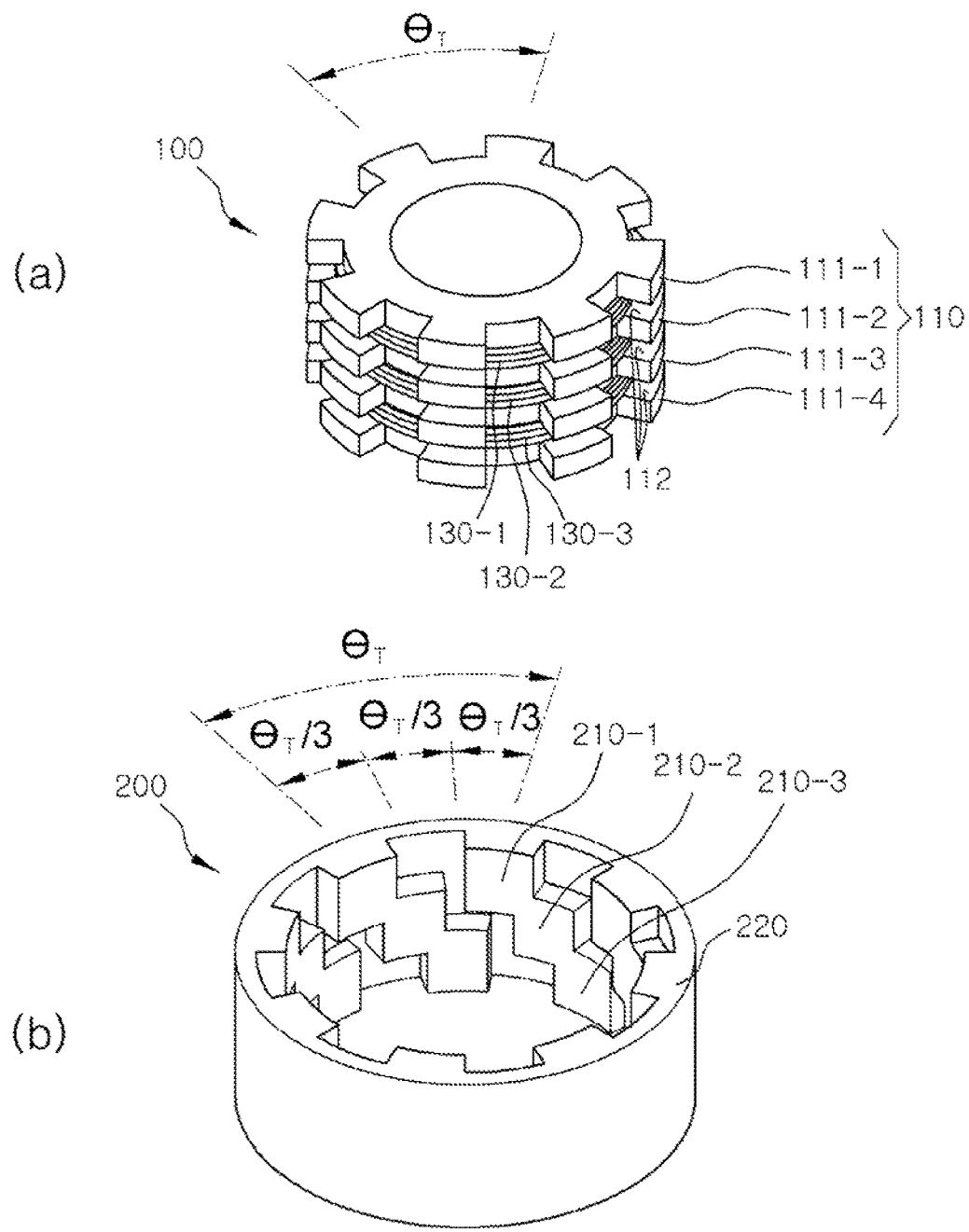
FIG. 13 illustrates a perspective view (a) of a stator core and a perspective view (b) of a rotator core among components of an outer-rotator-type switched reluctance motor according to a seventh embodiment of the present invention.

FIG. 13 illustrates a perspective view (a) of a stator core and a perspective view (b) of a rotator core among components of an outer-rotator-type switched reluctance motor according to a seventh embodiment of the present invention.

Figure 14:
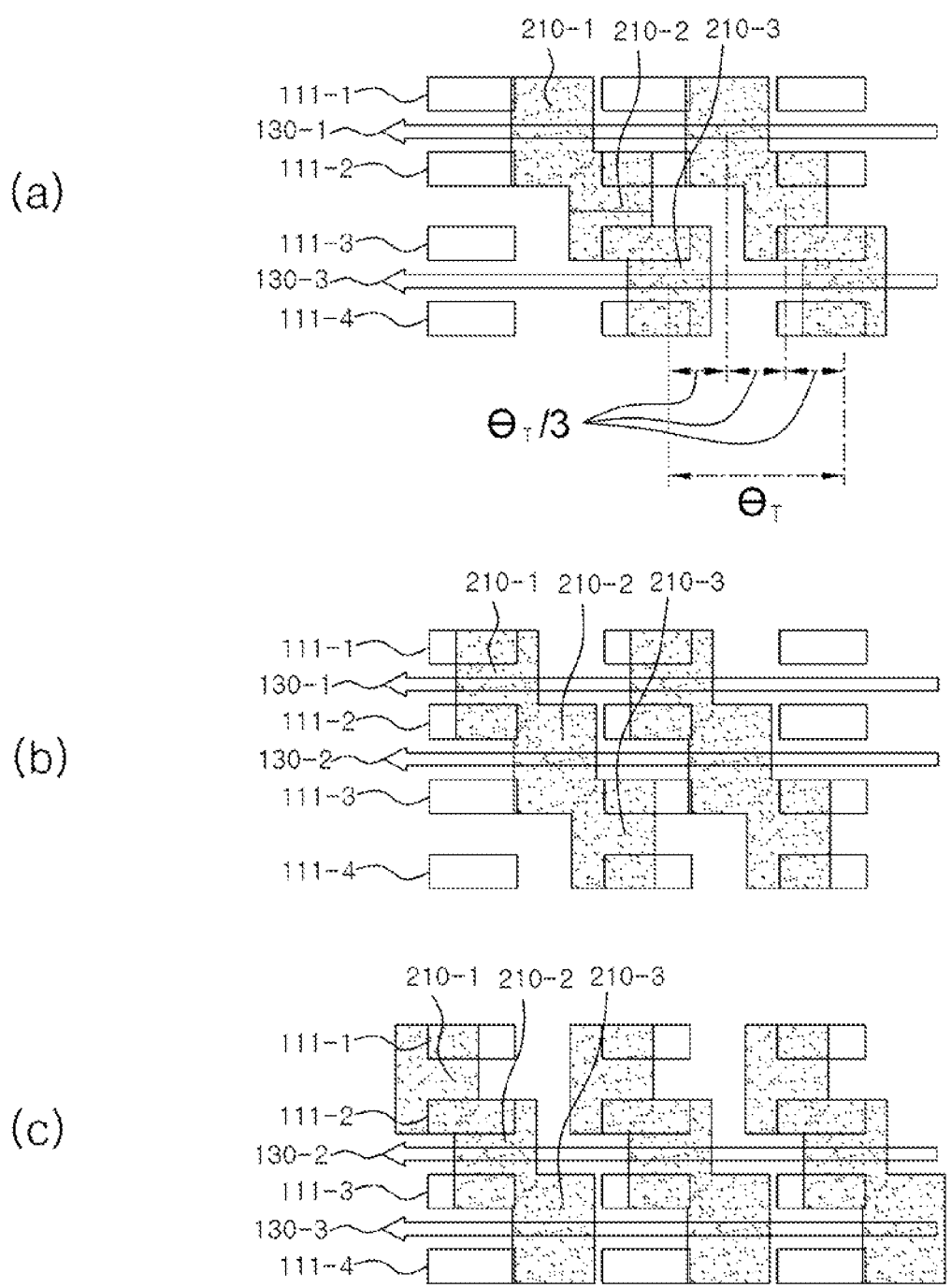
FIG. 14 is a plan view virtually illustrating changes in relative positions of a stator core 100 and a rotor core 200.

FIG. 14 is a plan view virtually illustrating changes in relative positions of a stator core 100 and a rotor core 200.

According to the seventh embodiment of the present invention, the stator core 100 has an eight-pole structure with eight stator salient poles 1110. Each stator salient pole 110 is configured with first, second, third, and fourth salient pole pieces 111-1, 111-2, 111-3, and 111-4 spaced apart from each other in the circumferential direction by three slots 112 formed at equidistant intervals along the rotation shaft direction. Three coils, i.e., first, second, and third coils 130-1, 130-2, and 130-3, are wound to pass through spaces between the first, second, third, and fourth salient pole pieces 111-1, 111-2, 111-3, and 111-4 and are spaced apart from each other along the rotation shaft direction. Thus, a three-phase structure is formed. That is, N=3.

The eight rotor salient poles formed along the circumferential direction on the inner circumferential surface of the rotator core 200, each, are formed to have first, second, and third rotor salient poles 210-1, 210-2, and 210-3 stepwise continuous to one another along the rotation shaft direction.

The first, second, and third rotor salient poles 210-1, 210-2, and 210-3 sequentially continuous to one another have angular differences (θT/N, N=3) of 380/8/3° in the circumferential direction, and each arc angle approaches 380/8/2°. Thus, a lower portion of the first rotor salient pole 210-1 and an upper portion of the second rotor salient pole 210-2 have an area in which they overlap each other by a predetermined angle in the circumferential direction, and a lower portion of the second rotor salient pole 210-2 and an upper portion of the second rotor salient pole 210-3 have also an area where they overlap each other.

The principle that a rotational force is applied to the rotator core 200 is described with reference to FIG. 14.

As shown in FIG. 14(a), as the first rotor salient pole 210-1 starts to face the first and second salient pole pieces 111-1 and 111-2, electricity is applied to the first coil 130-1 between the first and second salient pole pieces 111-1 and 111-2 to generate a positive torque. At this time, since the surface where the second rotor salient pole 210-2 faces the space between the second and third stator salient poles 111-2 and 111-3 decreases, the second coil 130-2 between the second and third salient pole pieces 111-2 and 111-3 is left not to be applied with electricity. Since the surface where the third rotor salient pole 210-3 faces the space between the third and fourth salient pole pieces 111-3 and 111-4 increases, application of electricity that has been applied to the third coil 130-3 between the third and fourth salient pole pieces 111-3 and 111-4 (since being in the state shown in FIG. 14c) is currently maintained.

Next, as shown in FIG. 14(b), since the surface where the third rotor salient pole 210-3 is aligned and then faces the third and fourth salient pole pieces 111-3 and 111-4 decreases while the surface where the first rotor salient pole 210-1 faces the space between the first and second salient pole pieces 111-1 and 111-2 increases, supply of electricity to the third coil 130-3 between the third and fourth salient pole pieces 111-3 and 111-4 is in a halt, and since the second rotor salient pole 210-2 starts to face the second and third salient pole pieces 111-2 and 111-3, electricity is applied to the second coil 130-2 between the second and third salient pole pieces 111-2 and 111-3 to generate a positive torque.

Here, if electricity starts to be applied to the second coil 130-2 while electricity is applied to the first coil 130-1, a magnetic field starts to be created in the second salient pole piece 111-2 between the first coil 130-1 and the second coil 130-2 by the second coil 130-2 while a magnetic field is formed by the first coil 130-1. Thus, impacts created upon application of electricity to the second coil 130-2 may be mitigated.

Next, as shown in FIG. 14(c), since the surface where the first rotor salient pole 210-1 is aligned and then faces the first and second salient pole pieces 111-1 and 111-2 decreases, supply of electricity to the first coil 130-1 is stopped, and because of moving in the direction along which the second rotor salient pole 210-2 is aligned with the second and third salient pole pieces 111-2 and 111-3, the third rotor salient pole 210-3 starts to face the third and fourth salient pole pieces 111-3 and 111-4 while supply of electricity to the second coil 130-2 is maintained. Thus, electricity is applied to the third coil 130-3 between the third and fourth salient pole pieces 111-3 and 111-4. Here, since a magnetic field is applied to the third salient pole piece 111-3 by the third coil 130-3 while a magnetic field by the second coil 130-2 is applied thereto, a mitigation effect may be obtained.

Figure 15:
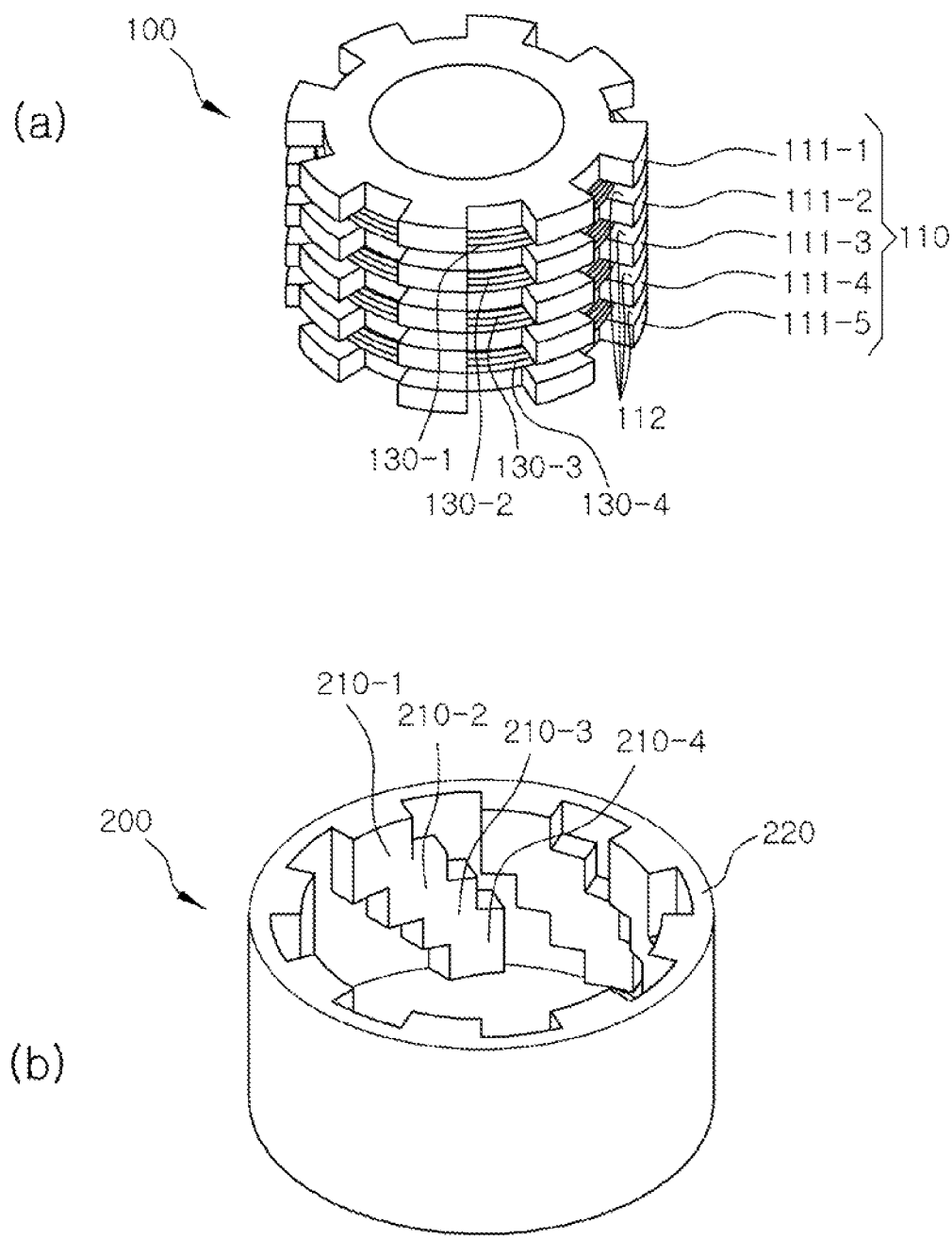
FIG. 15 illustrates a perspective view 9a) of a stator core and a perspective view (b) of a rotator core among components of an outer-rotator-type switched reluctance motor according to an eighth embodiment of the present invention.

FIG. 15 illustrates a perspective view 9a) of a stator core and a perspective view (b) of a rotator core among components of an outer-rotator-type switched reluctance motor according to an eighth embodiment of the present invention.

The eighth embodiment of the present invention is provided for a four-phase structure. Thus, four slots 112 are formed at equidistant intervals along the rotation shaft direction in each stator salient pole 110, and coils are wound along the circumferential direction while passing through the slots 112, respectively. Thus, the stator salient pole 110 includes first, second, third, fourth, and fifth salient pole pieces 111-1, 111-2, 111-3, 111-4, and 111-5, and first, second, third, and fourth coils 130-1, 130-2, 130-3, and 130-4 are provided to be wound around the stator salient pole at equidistant intervals along the rotation shaft direction.

Since eight stator salient poles 1110 are arranged at equidistant intervals along the circumferential direction, it has an eight-pole structure.

Eight rotor salient poles formed along the circumferential direction on the inner circumferential surface of the rotator core 200, each, have first, second, third, and fourth rotor salient poles 210-1, 210-2, 210-3, and 210-4 that are continuous to one another along the rotation shaft direction to provide a four-step shape.

The first, second, third, and fourth rotor salient poles 210-1, 210-2, 210-3, and 210-4 have an angular difference of 360/8/4° in the circumferential direction and form steps that are sequentially continuous to one another.

Likewise here, while electricity is applied to any one of the coils positioned adjacent to each other in the rotation shaft direction, application of electricity to the other coil is started, so that impact mitigation may be achieved by magnetic fields that overlappingly work to the salient pole piece between the two coils.

Figure 16:
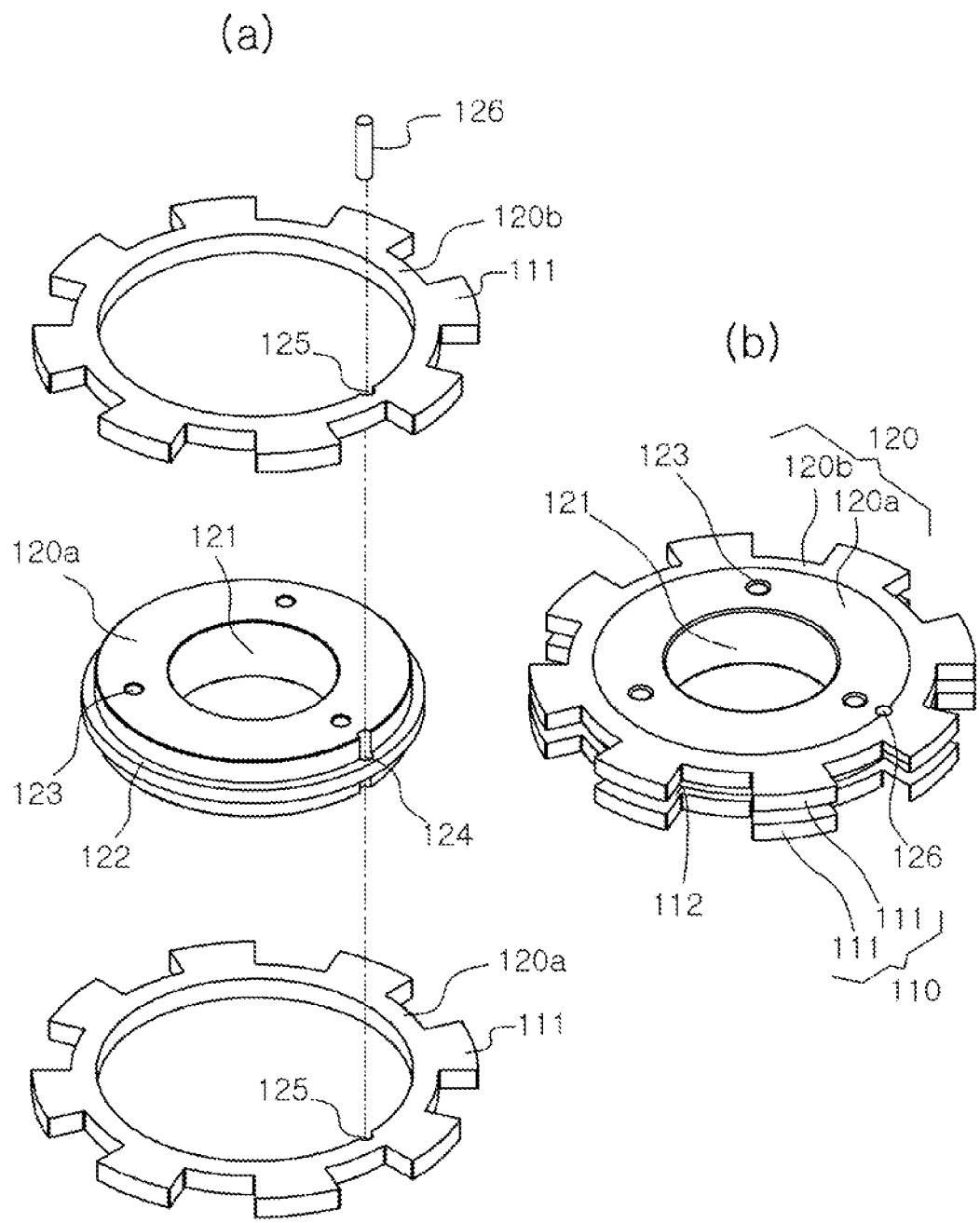
FIG. 16 illustrates a perspective view (a) of a stator core and a perspective view (b) of a rotator core among components of an outer-rotator-type switched reluctance motor according to a ninth embodiment of the present invention.

FIG. 16 illustrates a perspective view (a) of a stator core and a perspective view (b) of a rotator core among components of an outer-rotator-type switched reluctance motor according to a ninth embodiment of the present invention.

According to the ninth embodiment of the present invention, the stator core 100 may be configured by assembling the stator core described above in accordance with the first embodiment shown in FIG. 3.

According to this, the stator core 100 includes a first stator yoke 120a obtained by forming a pure iron ferromagnetic body or compressed powder ferromagnetic body having a magnetic domain arrangement in the rotation shaft direction in a hollow cylinder shape and two second stator yokes 120b configured of a silicon steel plate having salient pole pieces projecting isotropic-rectangularly on the outer circumferential surface along the circumferential direction. The second stator yokes 120b, respectively, are fitted over the first stator yoke 120a from the top and bottom of the first stator yoke 120a.

Here, an interval is provided between the second stator yokes 120b respectively fastened to the top and bottom of the first stator yoke 120a, leaving a slot 112 between the upper and lower salient pole pieces.

Specifically, the stator core 100 is shaped as a ring and includes two second stator yokes 120b having a plurality of salient pole pieces 111 formed on the outer circumferential surface thereof along the circumferential direction and a first stator yoke 120a shaped as a hollow cylinder and having annular stepped jaws 122 respectively formed along the edges of the top and bottom thereof to allow the second stator yokes 120b to be placed and fitted over the top and bottom thereof.

Here, at least, the salient pole pieces 111 of the second stator yokes 120b are formed to radially project beyond the mid-portion between the upper and lower stepped jaws 122 of the first stator yoke 120a, thus leaving the slot 112 between the upper and lower salient pole pieces 111 to allow a coil to be wound therearound.

Since the second stator yokes 120b need to be securely fastened to the first stator yoke 120a to prevent idling, semi-circular cuts 124 and 125 facing each other are formed in the contact surfaces between the second stator yokes 120b and the first stator yoke 120a, and a pin 126 is fitted through the cuts 124 and 125 so that a half of the pin 126 is fitted in the cut 125 of the second stator yoke 120b while the other half of the pin 126 is fitted in the cut 124 of the first stator yoke 120a.

A plurality of holes are formed through the first stator yoke 120a in upper and lower directions. A plurality of stator cores 100 formed as described above may be stacked one over another to configure a stator core for a multi-phase motor as shown in FIGS. 6 to 9.

As such, the assembled stator core may be used as a stator core for a high-capacity motor.

While the present invention has been shown and described with reference to exemplary embodiments thereof, it will be apparent to those of ordinary skill in the art that various changes in form and detail may be made thereto without departing from the spirit and scope of the present invention as defined by the following claims.

[DESCRIPTION OF ELEMENTS]

100, 100-1, 100-2, 100-3, 100-4: stator core
110: rotor salient pole
111, 111-1, 111-2, 111-3, 111-4, 111-5: salient pole piece
112: slot
120: stator yoke
130, 130-1, 130-2, 130-3, 140-4: coil
140: shaft
141: bearing
150: magnetic insulator
160: stator base
170: annular magnetic insulator
200, 200-1, 200-2, 200-3, 200-4: rotator core
210, 210-1, 210-2, 210-3, 210-4: rotor salient pole
220: rotor yoke
230: rotator frame
240: annular magnetic insulator
300: position detecting means
310: position detecting sensor
320: sensed target
400: controller

What is claimed is:

1. An outer-rotator-type switched reluctance motor, comprising:
a stator core including a stator yoke having a hollow formed therethrough in upper and lower directions, stator salient poles formed isotropic-rectangularly on an outer circumferential surface of the stator yoke, respectively having slots formed along a circumferential direction to separate each stator salient pole into upper and lower stator salient poles, and allowing a coil to sequentially pass through the respective slots of the stator salient poles and to be wound on the outer circumferential surface of the stator yoke along the circumferential direction, and a shaft rotatably mounted in the hollow of the stator yoke;
a rotator core having rotor salient poles isotropic-rectangularly formed on an inner circumferential surface thereof along the circumferential direction and covering and facing the upper and lower salient pole pieces of the stator salient poles with air gaps disposed therebetween and fastened to the shaft to be rotatable;
a position detecting means sensing a rotational position of the rotator core; and
a controller applying electricity to the coil during a time period where the stator salient poles and the rotor salient poles turn from non-alignment to alignment to generate a positive torque, wherein N slots are formed at equidistant intervals along the rotation shaft direction, wherein N>1, to form N+1 salient pole pieces, wherein the coil is wound around each slot, wherein the rotor salient poles have a plurality of upper-lower directional steps stepwise formed along the rotation shaft direction to be simultaneously aligned with two adjacent upper and lower salient pole pieces, wherein an angular difference occurs between the steps by an angle obtained by dividing the rotation angle between the two stator salient poles positioned adjacent to each other in the circumferential direction by N, wherein an overlapping portion corresponding to an upper-lower height of the salient pole pieces is provided between the two steps positioned adjacent to each other in the upper and lower directions so that the steps are continuous to each other through the overlapping portion, wherein the two salient pole pieces positioned adjacent to each other in the upper and lower directions and simultaneously aligned alternately with the steps are sequentially changed as the rotator cores are rotated, and wherein the controller stops the application of electricity at least before the time of the alignment after the electricity has started to be applied to the coil between the two salient pole pieces positioned adjacent to each other in the upper and lower directions and starting to simultaneously face the rotor salient poles.

2. The outer-rotator-type switched reluctance motor of claim 1, wherein a hollow cylinder-shaped magnetic insulator is provided to be tightly fastened to the inner circumferential surface of the stator core, and wherein the shaft is rotatably provided in an inner hollow of the magnetic insulator.

3. The outer-rotator-type switched reluctance motor of claim 1, wherein the stator yoke has a magnetic domain arrangement in the rotation shaft direction, the stator salient poles have a radial magnetic domain arrangement, and the rotor salient poles have a magnetic domain arrangement in the rotation shaft direction.

* * * * *